(12) United States Patent
Kim et al.

(10) Patent No.: US 10,423,325 B2
(45) Date of Patent: Sep. 24, 2019

(54) MOBILE TERMINAL AND METHOD FOR CONTROLLING THE SAME

(71) Applicant: LG ELECTRONICS INC., Seoul (KR)

(72) Inventors: Eunhye Kim, Seoul (KR); Suyoung Lee, Seoul (KR); Jisun Lee, Seoul (KR); Taeyoung Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 15/379,343

(22) Filed: Dec. 14, 2016

(65) Prior Publication Data

US 2018/0011630 A1    Jan. 11, 2018

(30) Foreign Application Priority Data

Jul. 5, 2016 (KR) .................. 10-2016-0085031

(51) Int. Cl.
| | | |
|---|---|---|
| *G06F 3/0482* | (2013.01) | |
| *G06F 3/0488* | (2013.01) | |
| *G06F 3/0481* | (2013.01) | |
| *G06F 3/0484* | (2013.01) | |
| *G06F 3/0486* | (2013.01) | |
| *G06F 1/16* | (2006.01) | |

(52) U.S. Cl.
CPC ........ *G06F 3/04883* (2013.01); *G06F 1/1626* (2013.01); *G06F 3/0482* (2013.01); *G06F 3/0484* (2013.01); *G06F 3/0486* (2013.01); *G06F 3/0488* (2013.01); *G06F 3/04817* (2013.01); *G06F 3/04842* (2013.01)

(58) Field of Classification Search
CPC ..................................................... G06F 3/0482
USPC ........................................................ 715/765
See application file for complete search history.

(56) References Cited

U.S. PATENT DOCUMENTS

| | | | | |
|---|---|---|---|---|
| 6,185,591 | B1 * | 2/2001 | Baker | G06F 17/24 715/210 |
| 7,818,718 | B2 * | 10/2010 | Wedel | G06F 9/451 717/110 |
| 9,104,300 | B2 * | 8/2015 | Brownholtz | G06F 3/0486 |
| 9,417,789 | B2 * | 8/2016 | Lee | G06F 3/0484 |
| 2010/0017710 | A1 * | 1/2010 | Kim | G06F 3/0414 715/702 |
| 2010/0029337 | A1 * | 2/2010 | Kuhl | H04M 1/6016 455/566 |
| 2012/0151400 | A1 * | 6/2012 | Hong | G06F 3/04817 715/769 |
| 2012/0154447 | A1 * | 6/2012 | Kim | G06F 1/1626 345/661 |

(Continued)

*Primary Examiner* — Daniel Rodriguez
(74) *Attorney, Agent, or Firm* — Lee, Hong, Degerman, Kang & Waimey PC

(57) ABSTRACT

A mobile terminal and a method for controlling the same are provided. A mobile terminal according to an embodiment of the present invention includes a display unit to output a first area thereon, the first area including a function icon, and a controller to detect setting information related to the function icon, on the basis of a touch degree of a first touch input applied to the function icon, wherein the controller applies the detected setting information to a setting of at least one application corresponding to at least one icon included in a second area, different from the first area, when a second touch input succeeding the first touch input is to applied to the second area.

18 Claims, 19 Drawing Sheets

(56) References Cited

U.S. PATENT DOCUMENTS

| | | | | |
|---|---|---|---|---|
| 2012/0169634 A1* | 7/2012 | Lee | G06F 3/04883 | 345/173 |
| 2013/0150128 A1* | 6/2013 | Tsunoda | H04M 1/67 | 455/566 |
| 2013/0169546 A1* | 7/2013 | Thomas | G06F 9/4451 | 345/173 |
| 2013/0215054 A1* | 8/2013 | Cho | G06F 3/03 | 345/173 |
| 2013/0314359 A1* | 11/2013 | Sudou | G06F 3/016 | 345/173 |
| 2013/0332872 A1* | 12/2013 | Grinberg | G06F 3/0486 | 715/769 |
| 2013/0335335 A1* | 12/2013 | Neelakant | G06F 3/0486 | 345/173 |
| 2014/0028589 A1* | 1/2014 | Reilly | G06F 3/0416 | 345/173 |
| 2014/0068481 A1* | 3/2014 | O'Connor | G06F 9/453 | 715/769 |
| 2014/0143698 A1* | 5/2014 | Kim | G06F 3/04817 | 715/768 |
| 2014/0232671 A1* | 8/2014 | Chaudhri | G06F 3/04883 | 345/173 |
| 2014/0267103 A1* | 9/2014 | Chaudhri | G09G 5/14 | 345/173 |
| 2014/0289661 A1* | 9/2014 | Venkatramanan | H04L 41/022 | 715/769 |
| 2014/0304631 A1* | 10/2014 | Wang | G06F 3/04817 | 715/765 |
| 2015/0052466 A1* | 2/2015 | Chun | G06F 3/0486 | 715/769 |
| 2015/0052486 A1* | 2/2015 | Goodman | G06F 3/04817 | 715/835 |
| 2016/0139738 A1* | 5/2016 | Wever | G06F 3/04847 | 715/810 |
| 2016/0179341 A1* | 6/2016 | Cho | G06F 3/04886 | 715/760 |
| 2016/0196419 A1* | 7/2016 | Kuscher | G06F 21/36 | 715/741 |
| 2016/0357422 A1* | 12/2016 | Milden | G06F 3/04847 | |
| 2017/0351403 A1* | 12/2017 | Yazdani | G06F 3/0414 | |

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and the right of priority to Korean Application No. 10-2016-0085031, filed on Jul. 5, 2016, the contents of which are incorporated by reference herein in its entirety.

BACKGROUND OF THE INVENTION

1. Field of the Invention

This specification relates to a mobile terminal having a touch screen, and a method for controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Also, in each application installed on a mobile terminal, various settings may be changed through a user manipulation or the like. For example, settings of every application can be changed at once using a setting application or a quick setting window, or settings may be changed in a manner of entering a setting step for each application and inputting setting to change.

However, when desiring to change only settings of a specific application or some applications while maintaining settings of other applications as they are, it is needed to always enter a setting step of the corresponding application and change settings thereof, which causes inconvenience in terms of requiring for a plurality of user manipulations.

SUMMARY OF THE INVENTION

Therefore, an aspect of the detailed description is to provide a mobile terminal capable of fast changing settings for a specific application or some applications without entering an individual setting step of each application, and a method for controlling the same.

Another aspect of the detailed description is to provide a mobile terminal capable of fast restoring a pre-applied setting change to an original setting value, and a method for controlling the same.

To achieve these and other advantages and in accordance with the purpose of this specification, as embodied and broadly described herein, there is provided a mobile terminal, including a display unit to output a first area thereon, the first area including a function icon, and a controller to detect setting information related to the function icon, on the basis of a touch degree of a first touch input applied to the function icon, wherein the controller applies the detected setting information to a setting of an application corresponding to at least one icon included in a second area, different from the first area, when a second touch input succeeding the first touch input is applied to the second area.

In one embodiment disclosed herein, the application to which the detected to setting information is applied may differ according to an attribute of information output on a touch point of the second touch input. The controller may change a setting value of an application selected according to the attribute of the output information, on the basis of the detected setting information.

In one embodiment disclosed herein, a graphic object notifying that the setting of at least one application has been changed may be output on the second area when the second touch input is released.

In one embodiment disclosed herein, the controller may detect one of a first state that a function corresponding to the function icon is activated and a second state that the function is deactivated, according to a touch degree of the first touch input exceeding reference pressure, applied to the function icon, and apply the detected state as a setting value of at least one application included in the second area, in response to the second touch input.

In one embodiment disclosed herein, recommendation information informing an application with a setting, to which the detected setting information is applicable, may be output on the second area when the setting information is detected and the second area is output.

In one embodiment disclosed herein, a notification icon notifying the detected setting information may be output adjacent to the function icon, in response to the setting information for the function icon being detected.

In one embodiment disclosed herein, the controller may detect second setting information corresponding to a changed touch degree when the touch degree of the first touch input is changed after first setting information is detected. The controller may control a change in an indication associated with the second setting information to be output on the notification icon.

In one embodiment disclosed herein, the controller may output a preview image associated with the application of the detected setting information, in response to a proximity touch being detected at one point of the second area after a release of the first touch input.

In one embodiment disclosed herein, the controller, in a state that the preview image is output, may move the preview image for output, in response to a change in a touch point of the proximity touch, and stop the application of the detected setting information when the proximity touch is released.

In one embodiment disclosed herein, the controller may output, adjacent to the function icon, a plurality of objects corresponding to a plurality of setting values of the detected setting information. A setting value of one of the plurality of objects may be applied to a setting of at least one application included in the second area, when the first touch input is dragged toward the one object.

In one embodiment disclosed herein, the first area and the second area may be output on different screens, and the controller may exclude a touch input, which is applied to the display unit during a movement from the first area to the second area after the first touch input is applied, from the second touch input.

In one embodiment disclosed herein, a setting having an attribute similar to an attribute of the detected setting information may be searched for from at least one application included in the second area, and then the detected setting information may be applied to the searched setting of the at least one application, when the attribute of the setting of the at least one application does not match the attribute of the detected setting information.

In one embodiment disclosed herein, the controller, in a state that the detected setting information has been applied to an application of the second area, may restore the setting information-applied state to a previous state, on the basis of a touch degree of a touch input applied to a menu for canceling an execution of a command input.

In one embodiment disclosed herein, a degree that the setting of the application of the second area is restored to the previous state may differ according to a changed degree of touch pressure of the touch input exceeding reference pressure, applied to the menu.

In one embodiment disclosed herein, the controller may output a release icon for releasing the detection of the setting information on the second area when the setting information has been detected, and terminate a process of applying the detected setting information when the second touch input is applied to the release icon.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
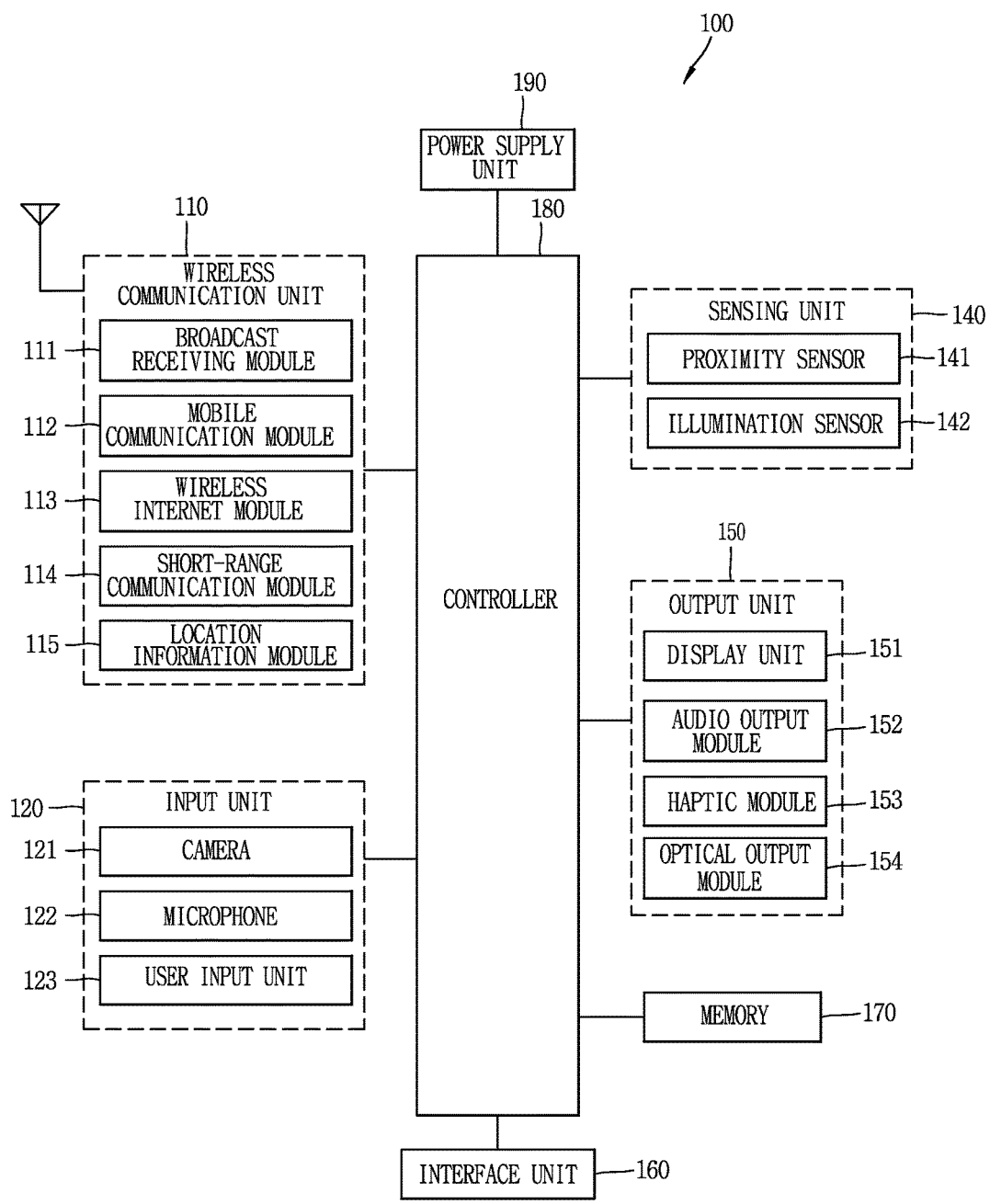
FIG. 1A is a block diagram of a mobile terminal in accordance with one exemplary embodiment of the present invention.
Figure 1B:
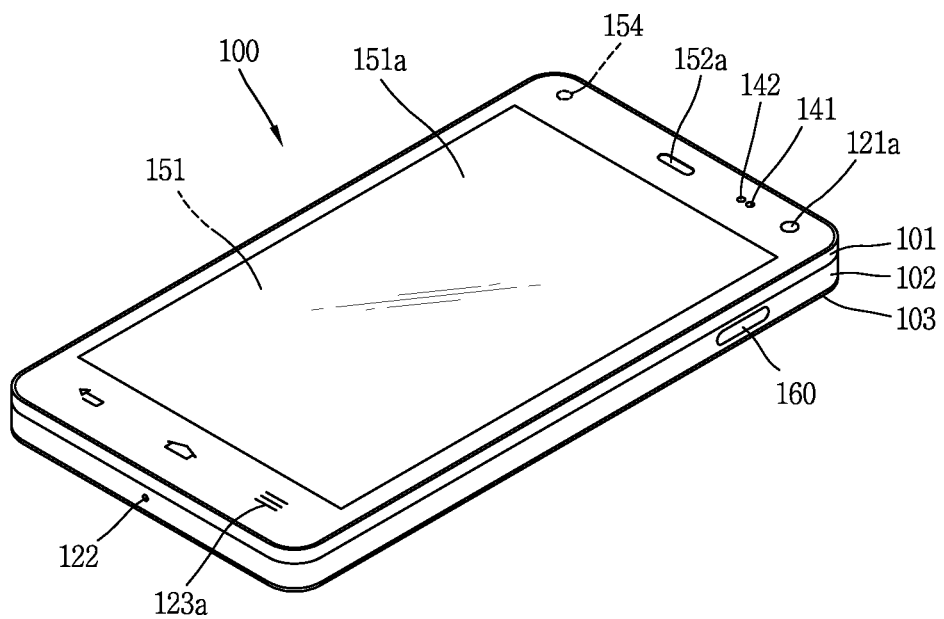
FIGS. 1B and 1C are conceptual views illustrating one example of a mobile terminal, viewed from different directions.
Figure 1C:
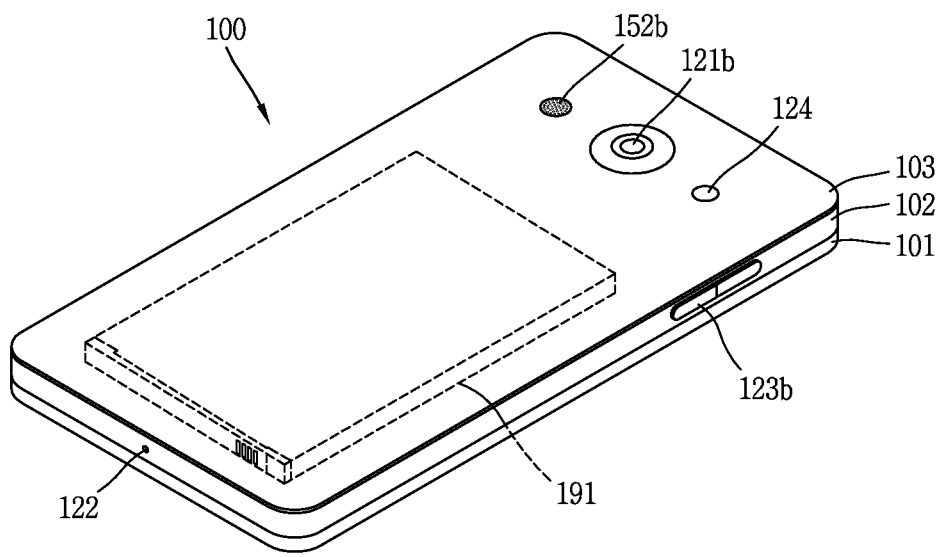

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or to video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control an operation associated with an application program and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 10:
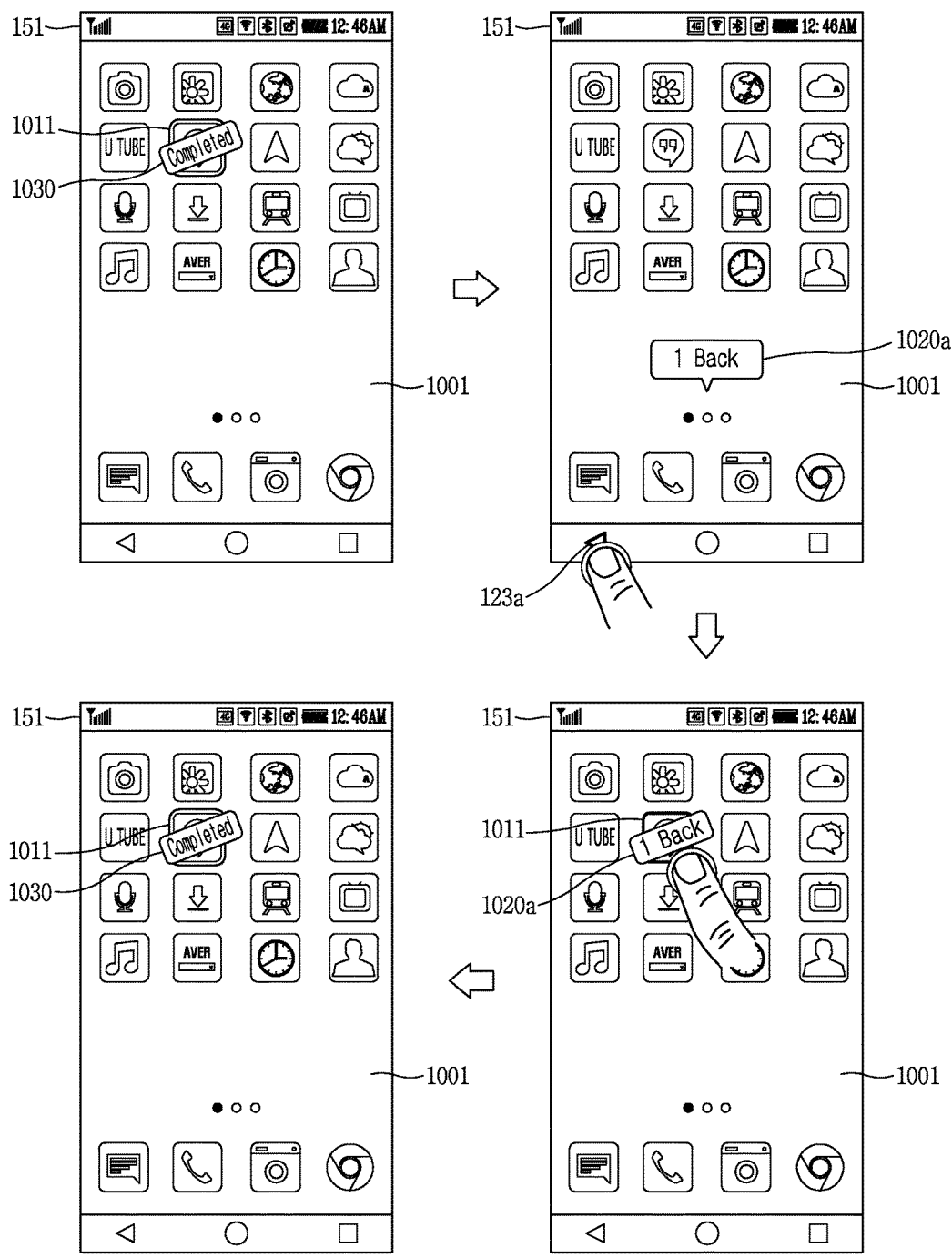

Referring now to FIGS. 1B and 10, the mobile terminal 100 is described with reference to a bar-type the body of the portable electronic device. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device. However, such teachings with regard to a particular type of portable electronic device will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

Meanwhile, the display unit 151 (or a touch sensor provided on the display unit 151) disclosed herein may sense a touch degree, namely, pressure intensity of a touch input applied to the display unit 151, and generate a touch signal corresponding to the sensed touch degree. To this end, the display unit 151 (or the touch sensor provided on the display unit 151) may include a plurality of piezoelectric elements. The generated touch signal includes information related to the pressure intensity (or piezoelectric intensity) of the touch input. The generated touch signal is transferred to the controller 180 such that an operation corresponding to the generated touch signal is executed.

Figure 2:
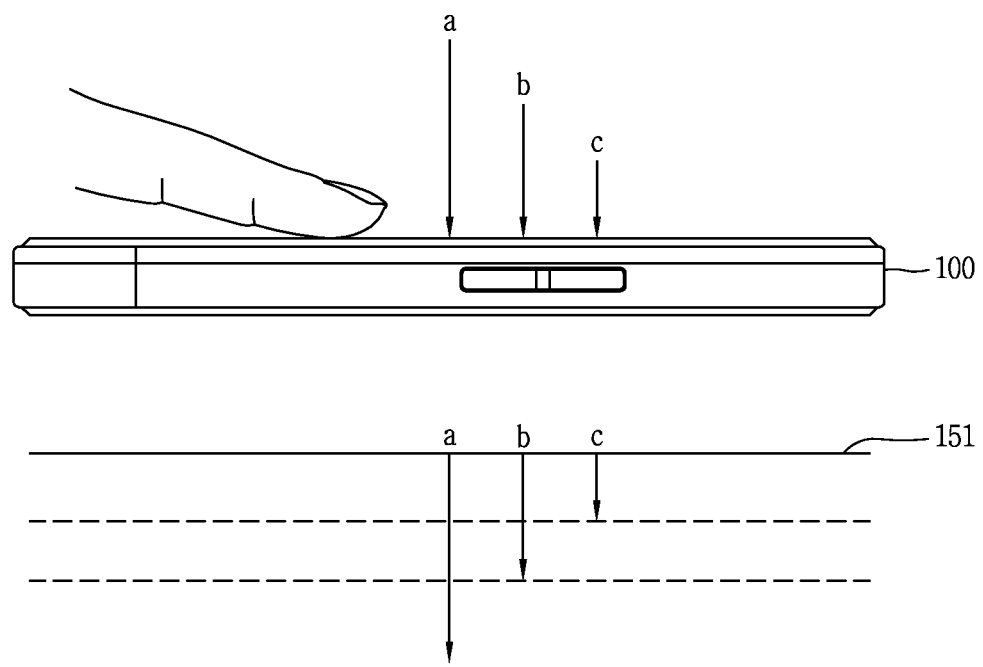
FIG. 2 is a conceptual view illustrating a touch degree of a touch input applied to a display unit of a mobile terminal according to the present invention.

FIG. 2 is a conceptual view illustrating a touch degree of a touch input applied to a display unit of a mobile terminal according to the present invention.

As illustrated in FIG. 2, touch pressure corresponding to a user's touch operation (input) applied to the display unit 151 of the mobile terminal 100 may be sensed in various manners (a, b, c), and the controller 180 may execute an operation that matches the sensed touch pressure of the touch input. To this end, the controller 180 may detect a voltage corresponding to the touch pressure and generate a different touch signal according to the detected voltage.

For example, when the user presses the display unit 151 by pressure intensity 'c,' a voltage with the lowest touch voltage level (e.g., below 0.04 V) may be detected and a first touch signal may be generated accordingly. As another example, when the user presses the display unit 151 more strongly by pressure intensity 'b,' a voltage in the range of 0.04 V to 1.5 V may be detected and a second touch signal may be generated accordingly. As another example, when the user much more strongly presses the display unit 151 by pressure intensity 'a,' a voltage with the highest touch voltage level or in the range of 1.5 V to 3.0 V may be detected and a third touch signal may be generated accordingly. Here, the first, second and third touch signals may be input values for executing different control commands. That is, the pressure intensity of each touch operation may be converted into a voltage numerical value, and used as a different input value.

Here, the first touch signal that generates the voltage with the lowest touch voltage level may have touch pressure less than reference pressure. Also, the second touch signal and the third touch signal that generate voltages exceeding the lowest touch voltage level may have touch pressure exceeding the reference pressure.

Also, when intensity of touch pressure varies while a touch operation exceeding the lowest voltage level, applied to the display unit 151, is not released, for example, when the touch pressure is lowered from original intensity, a plurality of touch signals such as the third touch signal and the second touch signal may be generated in the order corresponding to the touch pressure. In this instance, first information corresponding to the third touch signal and second information corresponding to the second touch signal may finally be output on the display unit 151 in a sequential manner.

Also, the voltage levels and the voltage values are merely illustrative and may be set variously. Also, the foregoing example has illustrated three pressure intensities of a touch operation. However, the present invention may not be limited to this. More or less pressure intensities may also be set.

Hereinafter, two different operations executed according to a degree exceeding a reference voltage will be described, but the present invention may be implemented by more operations than the two operations.

On the display unit 151 of the mobile terminal 100 according to the embodiment of the present invention that includes at least one of the aforementioned components, is displayed a first region on which at least one function icon is output. Here, the function icon refers to an object for executing a specific function mapped thereon in response to an input applied. Examples of the function icon may include an icon of an application, a menu icon, a notification icon, a setting icon, an execution icon and the like. Also, the function icon may correspond to a specific item of a context menu that is accessible in a state that a specific screen is output.

Also, the controller 180 of the mobile terminal 100 may detect setting information related to a function icon displayed on the display unit 151, on the basis of a touch degree of a first touch input which is applied to the function icon.

Here, the first touch input may refer to a touch input exceeding reference pressure. That is, a touch signal generated by the first touch input may generate a different control command from a first touch signal that is generated by a touch input with touch pressure within a reference pressure range.

Also, the setting information related to the function icon refers to setting values of a function corresponding to the function icon or various types of setting information set for an application corresponding to the function icon. For example, the setting information may include profile information, input attribute information, notification setting information, and even contents information such as a list of favorites, a list of recent searches, a list of recent plays, and the like.

Also, a type of the detected setting information may differ according to an attribute of a function icon, a setting value of a corresponding function, information set for a corresponding application and the like. For example, when a first touch input is applied to an icon of a navigation application, a recent route (path) search list, a destination setting list and the like that are stored in the navigation application may be detected as the setting information. As another example, when a first touch input is applied to an icon of a memo application, input attributes set in the memo application may be detected as the setting information.

After the setting information is detected, when a second touch input succeeding the first touch input is applied to a second area different from the first area on the display unit 151, the controller 180 of the mobile terminal 100 may apply the detected setting information to a setting of an application corresponding to at least one icon included in the second area.

Here, the second area to which the second touch input is applied refers to an area different from the first area. The second area may be output on one screen together with the first area, or output on a second screen, which is different from a first screen with the first area and accessible from the first screen through a user manipulation or the like. Also, the second touch input is a touch input different from the first touch input, for example, may be one of a single touch input, a double touch input, a drag touch input and various types of touch inputs with touch pressure less than the reference pressure.

Also, the application corresponding to the at least one icon included in the second area may be differently decided according to a touch point of the second touch input applied to the second area. For example, when the second touch input is applied to an icon of a specific application displayed on the second area, settings of the application of the icon may change. In this instance, when there is no attribute that matches an attribute of the detected setting information, among the attributes of the settings of the application of the corresponding icon, a setting value having the most similar attribute may change.

As described above, the present invention can detect a specific function value or setting information based on a first touch input exceeding reference pressure and then change settings of a desired application more easily and fast based on a succeeding touch input applied on a home screen, without having to change individual settings of a specific application one by one.

Figure 3:
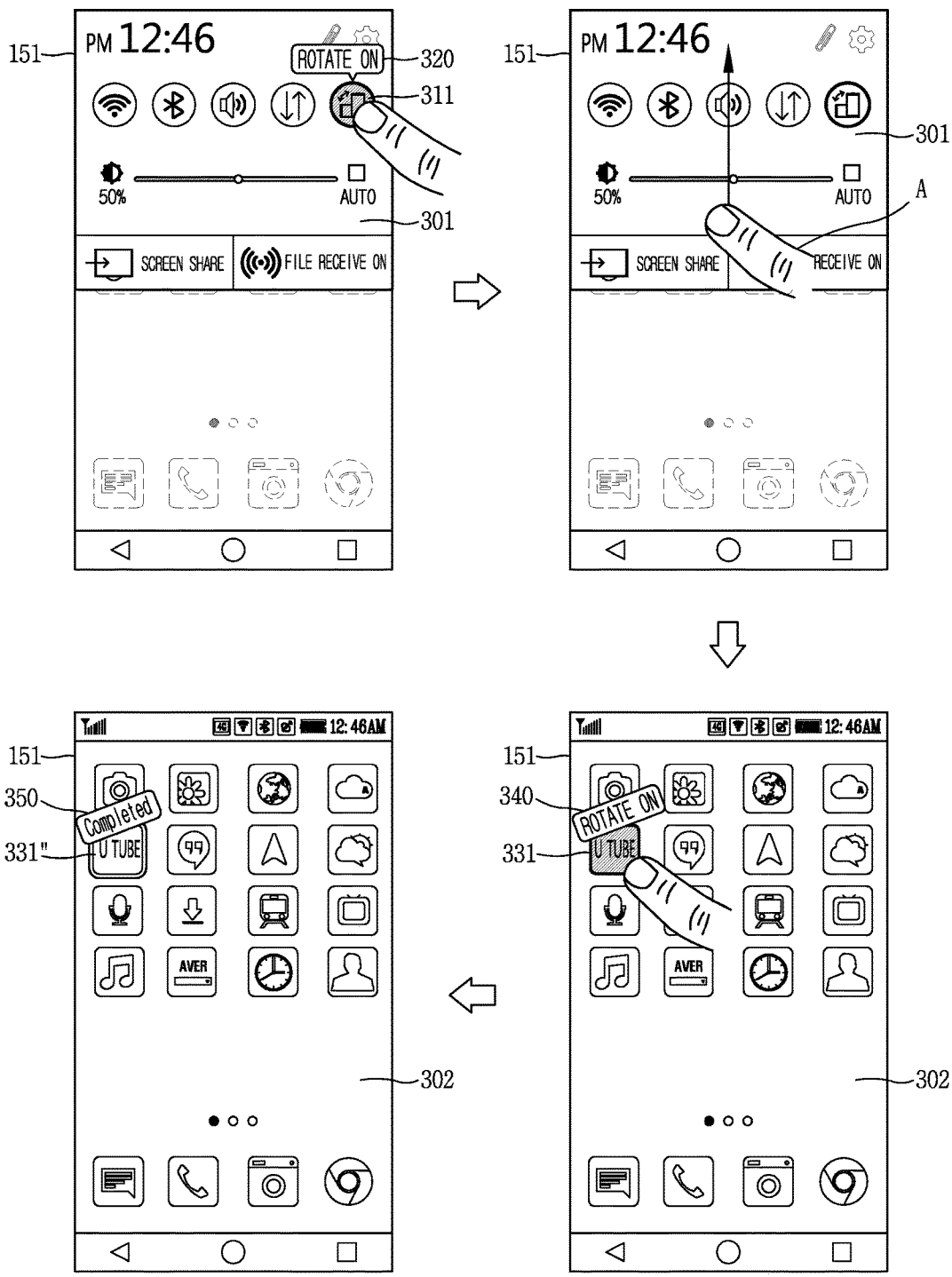
FIG. 3 is a conceptual view illustrating representative operations of a mobile terminal according to the present invention.

FIG. 3 is a conceptual view illustrating representative operations of a mobile terminal according to the present invention.

First, a quick setting window screen 301 may be output on the first area of the display unit 151 of the mobile terminal 100. On one area of the quick setting window screen 301 may be output function icons for setting/releasing various functions for directly setting/releasing at least one function on the mobile terminal 100, for example, Wi-Fi, Bluetooth, sounds, data communication, screen rotation and the like.

In this instance, when a touch input with pressure exceeding reference pressure is applied to a first function icon 311 for setting/releasing a screen rotation, among the plurality of function icons, a current setting value of the function corresponding to the first function icon 311 is detected as setting information. That is, a value corresponding to 'screen rotation ON' is detected. And, guide information (e.g., 'rotation ON') 320 for notifying the detected setting information is popped up near the first function icon 311 in the form of a speech bubble, for example.

Afterwards, when the touch input exceeding the reference pressure applied to the first function icon 311 is released, the controller 180 of the mobile terminal 100 may execute an operation mode for applying the detected setting information as a setting value of a specific application, while remembering the detected setting information. In this instance, in order to notify the currently-executed operation mode to the user, various visual effects for indicating that a specific operation mode is currently executed, for example, a generation of a specific icon and an activation of the icon may be output on the second area or the display unit 151.

While the operation mode is executed, the controller 180 of the mobile terminal 100 may decide an application to which the detected setting information is to be applied through a succeeding touch input applied to the display unit 151.

In this instance, the touch input for searching for an application to which the detected setting information is to be applied may be excluded from the aforementioned second touch input. For example, in FIG. 3, after the value corresponding to the screen rotation ON is detected, a drag touch input A for switching the quick setting window screen 301 into a previous screen generates a control signal for switching a screen back to the previous screen. Accordingly, a home screen 302 as the previous screen of the quick setting window screen 301 may be displayed.

In this manner, in the state that the home screen 302 is output on the second area, when a touch input is applied to an icon (e.g., Utube icon) 331 of a specific application, a value corresponding to the screen rotation ON which has been detected on the quick setting window screen is applied as a setting value of the corresponding application. Accordingly, the Utube application is set such that an output direction of an execution screen (e.g., video) is automatically changed into a landscape/portrait mode according to an orientation of the display unit 151.

In this instance, a first notification icon (e.g., 'rotation ON') 340 that notifies setting information to be applied to the touch input-applied icon 331 of the application may be popped up. Here, the first notification icon 340 may be an image different from the guide information 320 which has been output upon detecting the setting information.

Afterwards, when the touch input applied to the icon 331 of the application is released, a second notification icon (e.g., 'Completed') 350 that notifies a completion of the change in the setting of the application may be displayed for a preset time and then disappear.

Although not illustrated, after changing the setting value of the application corresponding to the icon 331, a touch input may be applied to an icon of another application on the home screen 302. Accordingly, the setting value of the screen rotation ON can be applied easily and fast for a plurality of applications.

As described above, the present invention can change a specific setting value for a specific application or each of a plurality of applications more easily and fast without executing a plurality of steps.

Figure 4:
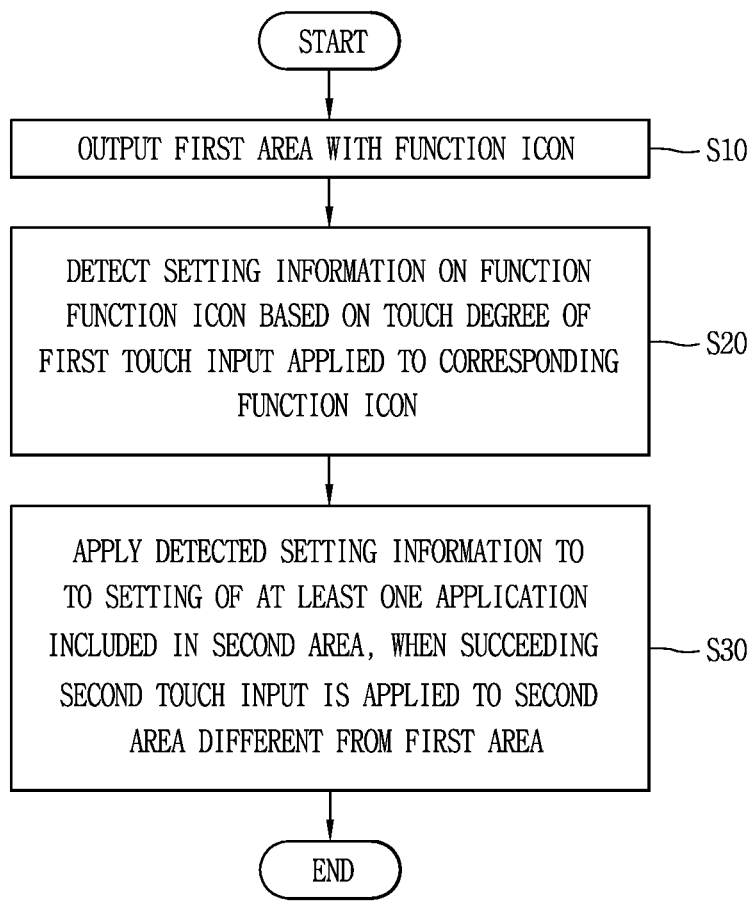
FIG. 4 is a flowchart illustrating a control method of a mobile terminal according to the present invention.

FIG. 4 is a flowchart illustrating a control method of a mobile terminal according to the present invention, First, a first area including at least one function icon is output on the display unit 151 of the mobile terminal 100 according to the embodiment of the present invention (S10). Here, the function icon is an object for executing a specific function or a specific application. Examples of the function icon may include a menu icon, a key icon, an execution icon, a notification icon, an application icon and the like. Also, the first area may be an area of the function icon, or one area or an entire area of the display unit 151 including the function icon.

Next, the controller 180 of the mobile terminal 100 detects setting information related to a function icon within the first area, based on a touch degree of a first touch input applied to the function icon within the first area (S20).

Here, the first touch input may refer to a touch input with pressure exceeding reference pressure. In detail, the first touch input may refer to a touch input having touch pressure generating a different control command from a control command for executing a function of the function icon.

In addition, the setting information for the corresponding function icon refers to a setting value of a function corresponding to the function icon, or various types of setting information set for an application corresponding to the function icon. For example, the setting information may include all of profile information, input attribute information, notification setting information, a list of favorites and the like. Also, the detected setting information may differ according to an attribute of the function icon, a setting value of the corresponding function, information set for the corresponding application, and the like.

In detail, when the first touch input is applied to the function icon, the controller 180 may recognize a function or application corresponding to the function icon, and generate a control command for detecting at least some of current setting values for the corresponding function or application.

In one embodiment of the present invention, a type of setting information to be detected may be decided according to a type of a recognized function or application. For example, when the first touch input is applied to an icon of an SNS application, the controller 180 may recognize the SNS application, and detect user information related to the application, for example, profile information and a profile image, as setting information. Another example, when the first touch input is applied to an icon of a memo application, the controller 180 may detect input attribute values of the memo application, such as information related to type, color, thickness and the like of a pen, as setting information.

The controller 180 may also execute a different level (degree) of detection of the setting information with respect to the function icons on the basis of a touch degree of the first touch input. For example, when a touch degree of the first touch input exceeding the reference pressure corresponds to touch pressure, by which a voltage in the range of 0.04 V to 1.5 V, illustrated in FIG. 2, is detected, the controller 180 may detect first setting information. When the touch degree of the first touch input corresponds to touch pressure by which a voltage with the highest voltage level or in the range of 1.5 V to 3.0 V is detected, the controller 180 may detect second setting information.

Here, the first setting information and the second setting information may be different types of setting information or the second setting information may include at least the first setting information. Also, in one embodiment, voltage levels detected according to the touch pressure of the first touch input may be divided into three or more levels, and in this instance, the detection level of the setting information may also be divided into three or more levels.

When the setting information related to the function icon is detected, the controller 180 may execute an operation mode for changing a setting value of at least one application on the basis of the detected setting information. This operation is similar to copying and pasting text. That is, when specific text is copied and pasted, the following paste operation is prepared while remembering the copied text.

The controller 180 may also detect and remember not only a current setting value of the corresponding function but also associated information regarding the setting value, for example, attribute information related to the setting to value, option information, metadata and the like, such that the detected setting information can be easily mapped on the setting of the specific application when detecting the setting information.

Next, when a succeeding second touch input is applied to a second area, different from the first area, after release of the first touch input, the controller 180 applies the detected setting information to a setting of an application corresponding at least one icon included in the second area (S30).

Here, the second area may be an area which is output on one screen simultaneously with the first area. For example, a function icon to which the first touch input is applied may be the first area on a home screen, and the other area of the home screen except for the first area may be the second area.

Or, the second area may be an area displayed on a second screen, which is different from the first screen with the first area output thereon and accessible from the first screen in a direct or indirect manner. In this instance, as aforementioned, a touch input for moving from the first area to the second area may be excluded from an input, namely, the second touch input for changing the setting information of the application.

Also, the at least one icon included in the second area may include an icon of an application, a notification icon, a widget and the like.

The controller 180 may also differently decide a type and range of application to which the detected setting information is to be applied as a setting value, according to a touch point of the second touch input applied to the second area.

For example, when the touch point of the second touch input is located on an icon of a specific application included in the second area, only a setting value of the application of the icon is changed based on the detected setting information.

When the second touch input is released after applying the detected to setting information, the controller 180 may output a graphic object or notification icon on the second area to notify the change of the setting of the at least one application.

Hereinafter, description will be given in more detail of various embodiments for fast changing setting values of at least one application using touch inputs, with reference to the accompanying drawings.

Figure 5:
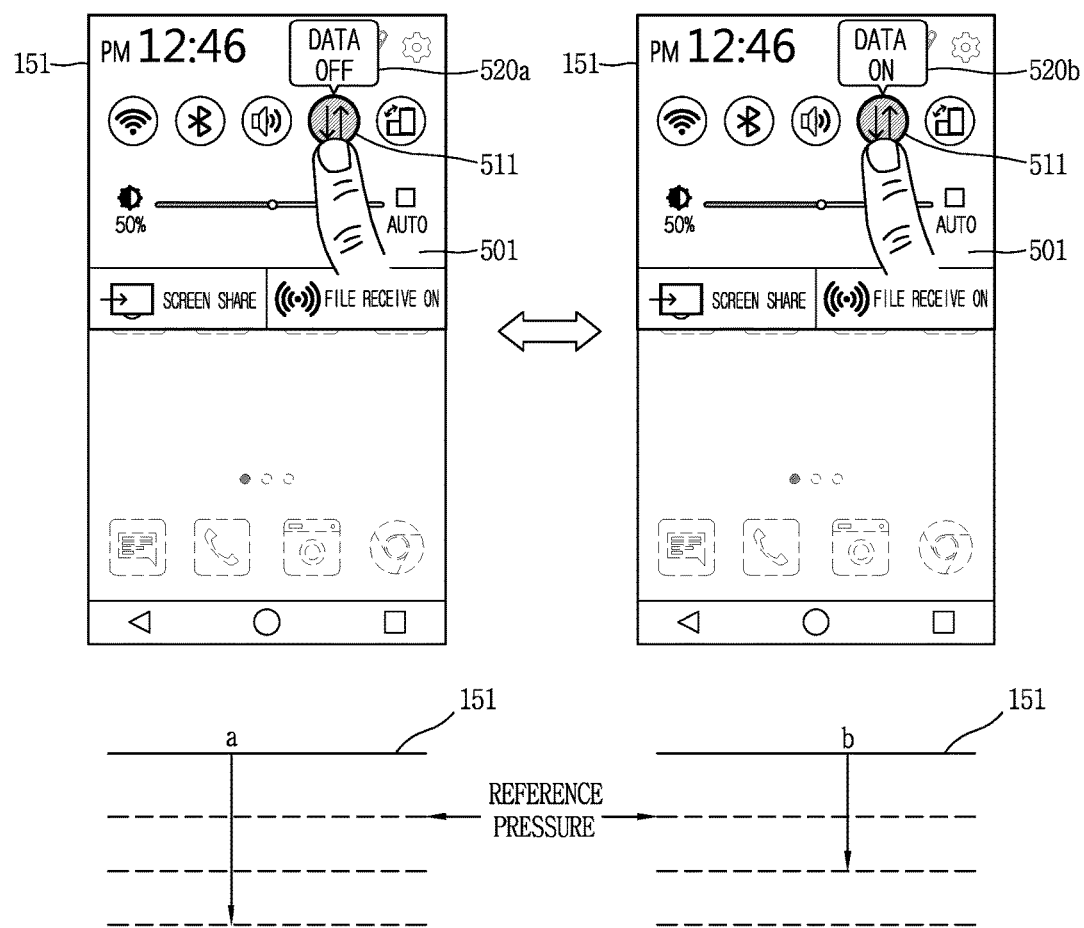
FIGS. 5, 6A, 6B, 7A, 7B, 8, 9A, 9B, 9C, 10, 11, 12A, 12B and 13 are conceptual views illustrating various embodiments related to fast applying setting information related to a specific icon to a setting of another application, on the basis of a touch degree of a touch input in a mobile terminal according to the present invention.

As one embodiment according to the present invention, FIG. 5 illustrates an embodiment of differently detecting a setting value for a function icon, on the basis of a touch degree of a first touch input.

To this end, the controller 180 may detect one of a first state that the corresponding function is activated and a second state that the corresponding function is deactivated, according to a touch degree of the first touch input, in the step (S20) of detecting the setting information according to the touch degree of the first touch input.

For example, as shown in a left drawing of FIG. 5, when the first touch input is applied to a data ON/OFF icon 511 on the quick setting window screen 501 with pressure intensity a, a voltage with the highest voltage level or in the range of 1.5 V to 3.0 V may be detected. Accordingly, a setting value that is different from a current setting value of the corresponding icon 511 is detected as setting information. That is, a function corresponding to the data ON/OFF icon 511 is currently in an active state (ON), but a value corresponding to an inactive state of the corresponding function may be detected as the setting information. Accordingly, a 'data OFF' message is output on a notification icon 520a notifying the detected setting information, even though the corresponding icon is in the active state.

Also, as illustrated in a right drawing of FIG. 5, when the first touch input is to applied to the data ON/OFF icon 511 with pressure intensity b lower than the intensity a, a voltage in the range of 0.04 V to 1.5 V may be detected, and accordingly, a current setting value of the corresponding icon 511 is detected as the setting information. Therefore, a 'data ON' message indicating the current setting value is output on a notification icon 520b.

Meanwhile, when the pressure intensity is changed from one of the intensities a and b to another without the release of the first touch input, the detected setting value is also changed accordingly. In this instance, the setting information is detected on the basis of touch strength applied just before the release of the first touch input.

Next, in response to a succeeding second touch input, the detected state, for example, the 'data ON' state may be applied as a setting value of an application corresponding to the at least one icon included in the second area.

According to the embodiment, even when a setting value different from a current setting value of a specific function icon is detected, a desired setting value can be easily detected through one touch input.

Figure 6A:
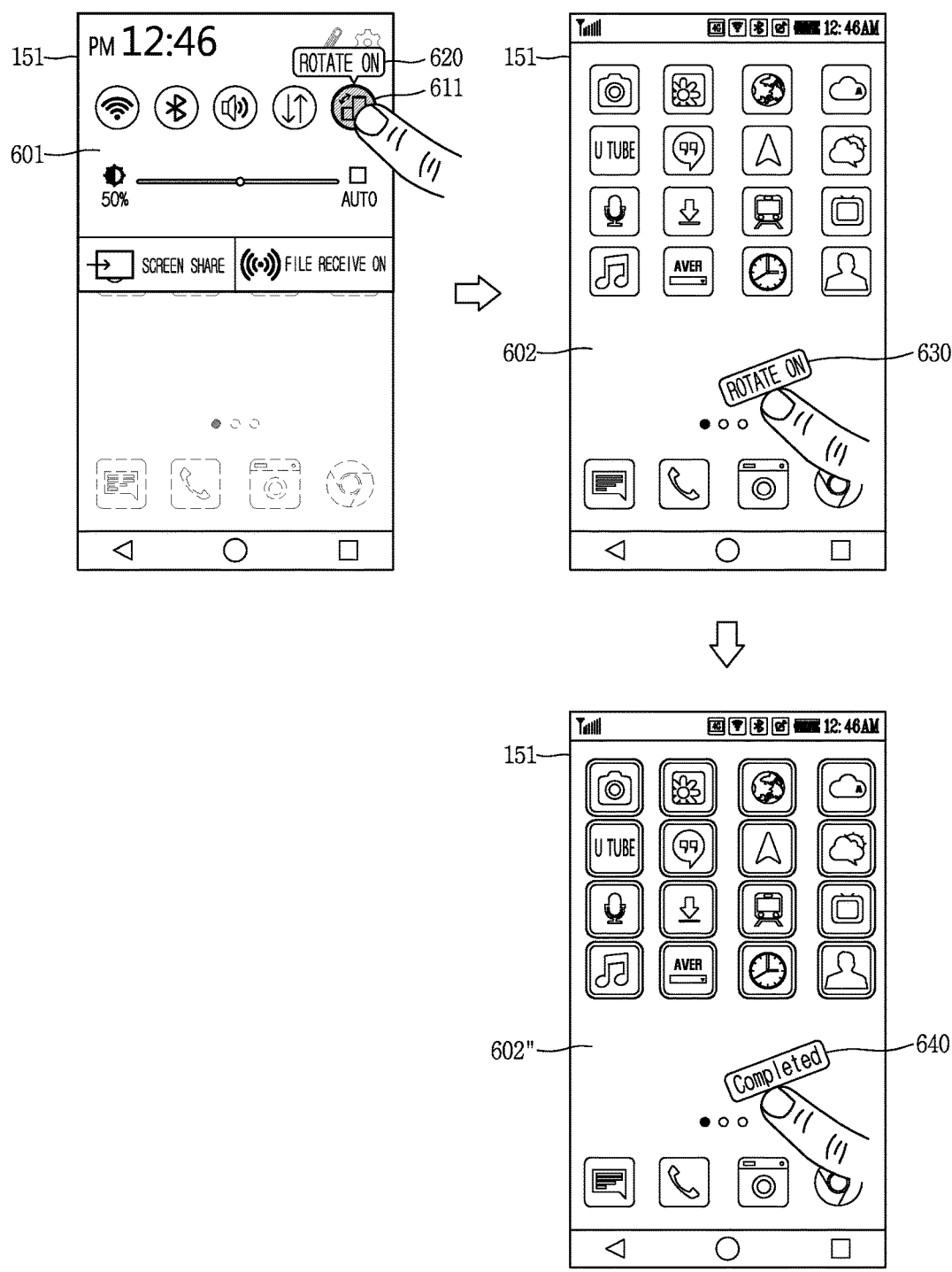
Figure 6B:
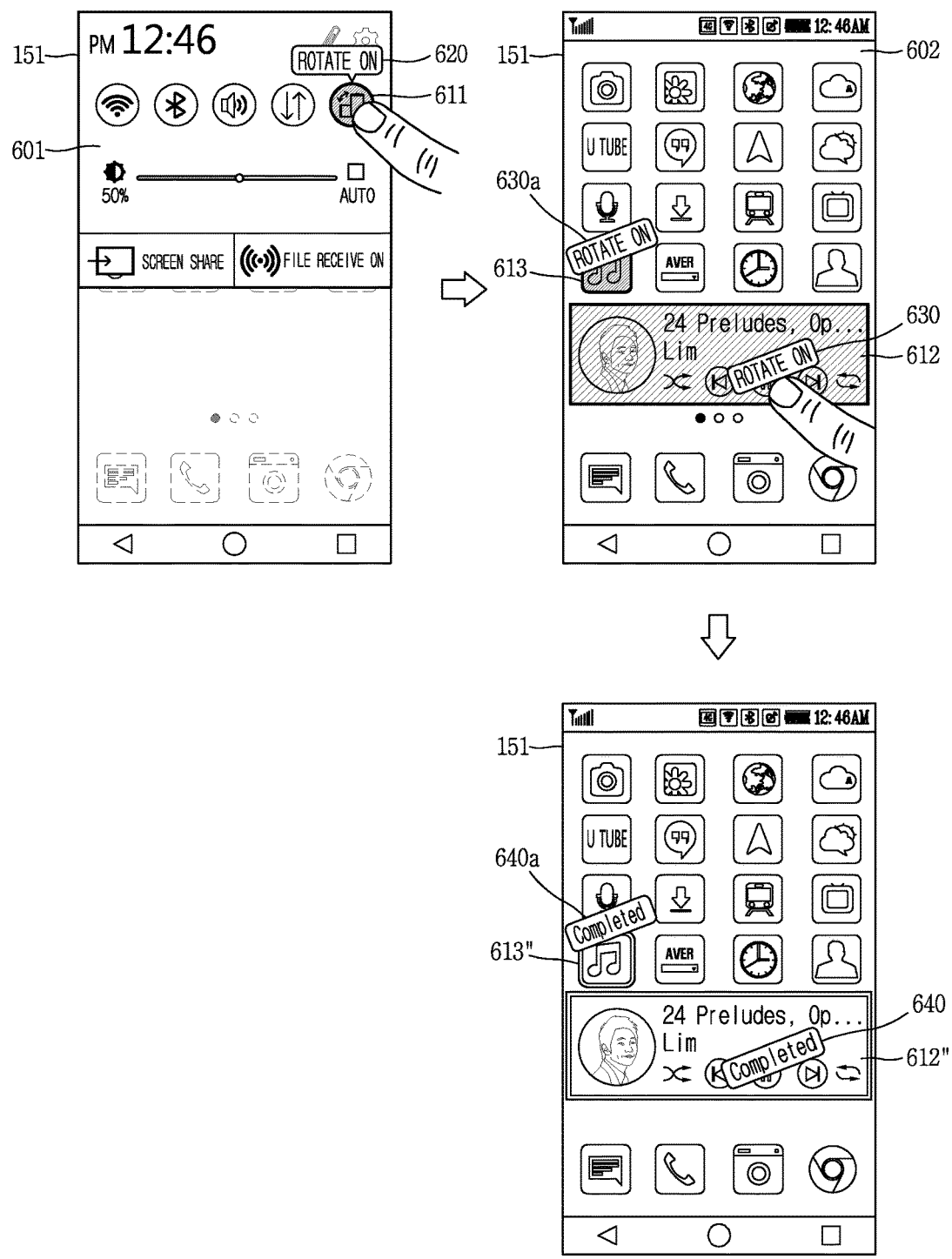

As one embodiment of the present invention, FIGS. 6A and 6B illustrate different embodiments of selecting an application, to which the setting information detected in the step S20 is to be applied as a setting value, by using a second touch input.

An application to which the detected setting information is to be applied as a setting value may differ according to an attribute of information which is output on a touch point (applied point) of the second touch input.

The controller 180 may change a setting value of at least one application, which is selected according to an attribute of information output on the touch point of the second touch input, on the basis of the detected setting information.

First, FIG. 6A illustrates an embodiment of changing settings of a plurality of applications at once by applying a touch input to a background screen.

When a first touch input exceeding reference pressure is applied to a screen rotation icon 611 on a quick setting window screen 601 output on the display unit 151, a currently-set 'rotation ON' value is detected as setting information. In this state, when a preset touch gesture (e.g., swipe input applied upward) is applied to the quick setting window screen 601, a home screen 602 which is a previous screen and includes icons corresponding to a plurality of applications is output on the second area.

In this instance, when a touch input is applied to a background screen area of the home screen 602, namely, an area without including any of the application icons, a first notification icon (rotation ON') 630 that notifies setting information to be applied is output on a touch point of the touch input. Then, after a lapse of a preset time, the 'rotation ON' setting value is applied to every application corresponding to the icons output on the current screen. Accordingly, a graphic effect indicating the changes in the setting values, for example, a highlighting effect is output around the icons of all of the applications (602"), and a second notification icon 640 notifying the complete change of the setting information is output.

In one embodiment, the setting change may not be applied to an application without any setting value having an attribute, which matches the attribute of the detected setting information, even though the second touch input is applied to the background screen area of the home screen 602.

Also, in one embodiment, a touch operation of turning over the home screen 602 may additionally be executed while the second touch input is maintained. In this instance, setting values of applications that are output on a plurality of pages may fast be changed in response to the operation of turning over the pages.

Next, FIG. 6B illustrates an embodiment of simultaneously changing a setting of an associated application by applying a touch input to a specific widget.

In a state that a 'rotation ON' value has been detected as setting information by applying a first touch input to the screen rotation icon 611, when a second touch input is applied to a specific widget icon 612 of icons output on the home screen 602, a screen change corresponding to the second touch input is also output on an icon 613 of an application that matches the corresponding widget icon 612. For example, first notification icons 630 and 630a notifying the change in the setting information, and second notification icons 640 and 640a notifying the completion of the change in the setting information are simultaneously displayed on the widget icon 612 and the application icon 613.

Although not illustrated, when the user has sorted associated applications for each folder, the second touch input may be applied to a specific folder icon including icons corresponding to a plurality of applications on the home screen 602, so as to simultaneously apply the detected setting information to the applications of the icons included in the folder icon.

Although not illustrated, when a pivot gesture of pivoting a touch object which applies the second touch input is executed after the second touch input is applied, a different value from the setting value of the detected setting information may be applied. For example, when the second touch input is applied to the background screen area of the home screen 602 and then the pivot gesture is executed in FIG. 6B, a notification output on the first notification icon 630 may be changed into 'rotation OFF' and a different value from the pre-detected setting value, namely, a setting value corresponding to the changed notification may be applied to every application.

Meanwhile, although not illustrated, a target to which the detected setting information is to be applied may immediately be changed by dragging the second touch input without releasing it and then releasing the second touch input on a desired position. For example, when the second touch input is dragged to an area of the specific widget described in FIG. 6B within a predetermined time after the first notification icon 630 is output in FIG. 6A, a target to which the detected setting information is to be applied may be easily changed from every application to an application associated with the specific widget.

Figure 7A:
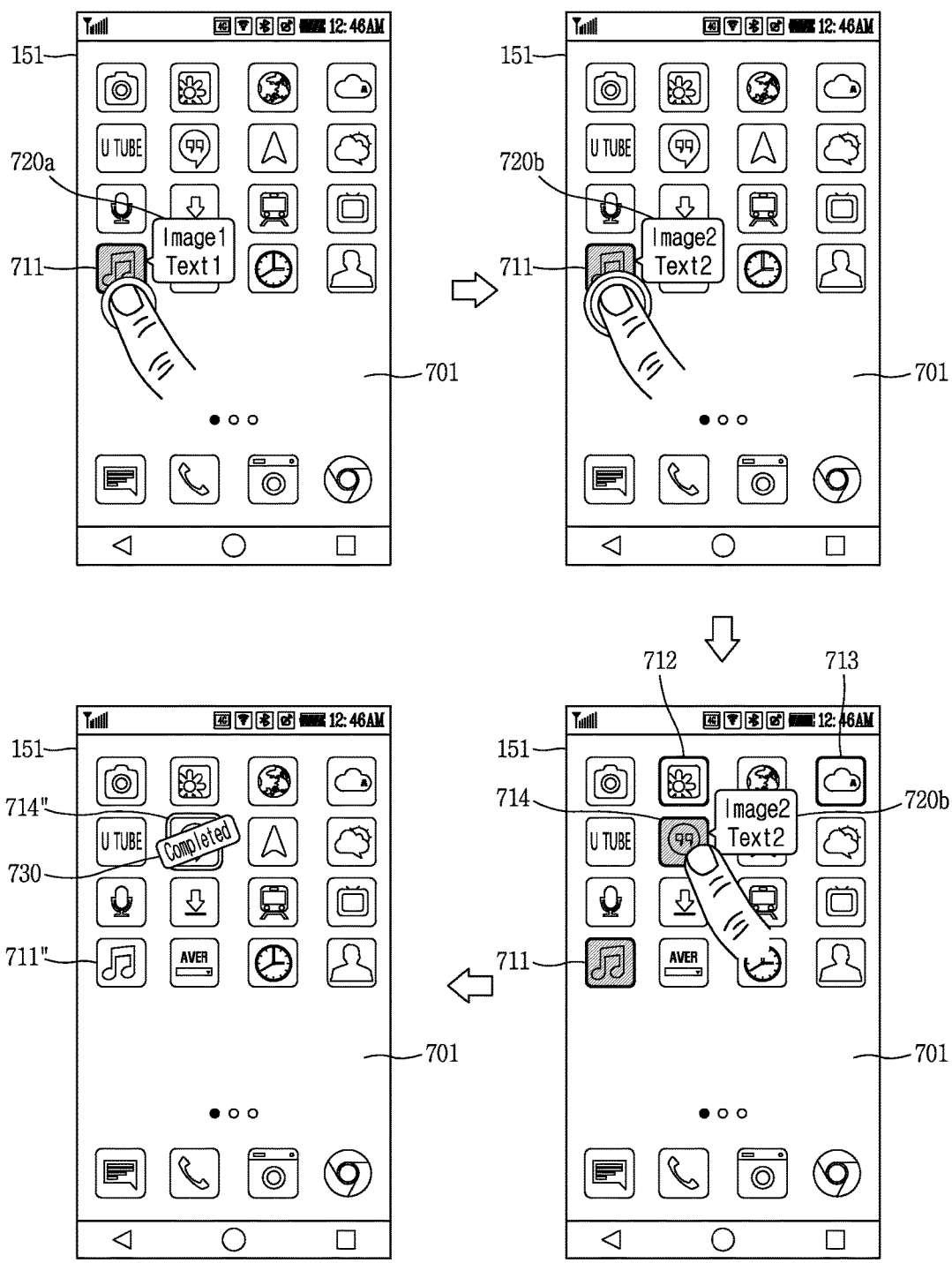

As one embodiment according to the present invention, FIG. 7A illustrates an operation of the mobile terminal when the detected setting information has a plurality of attributes.

First, when attributes of the setting information detected according to the first touch input are different from each other, an indication corresponding to each attribute may be output in a visually distinguishable manner. In detail, in FIG. 7A, when a part of setting information, which is detected in response to a first touch input applied to an icon 711 of a first application on a home screen 701 in FIG. 7A, has a first attribute including 'text' and another part of the setting information has a second attribute including 'image,' the different attributes, namely, a first attribute and a second attribute (Image 1, Text1) of the detected setting information may also be output on a notification icon 720a notifying the detected setting information.

In this state, when touch pressure of the first touch input exceeding the reference pressure more increases, pre-detected first setting information may be changed into second setting information. In this instance, the second setting information may have a different setting value from the first setting information, or include every setting value of at least the first setting information.

Meanwhile, when the attribute of the second setting information is the same as an attribute of the changed first setting information, namely, when the second setting information and the first setting information have the same attribute and different contents, as illustrated in FIG. 7A, 'Image2, Text 2' may be output (720b). Afterwards, when a second touch input is applied to an icon 714 of a second application, a second notification icon 720b on which attributes of a finally-detected setting information are output is popped up adjacent to the icon 714 of the second application, and the second setting information having the corresponding attributes is applied as a setting value of the second application.

Figure 7B:
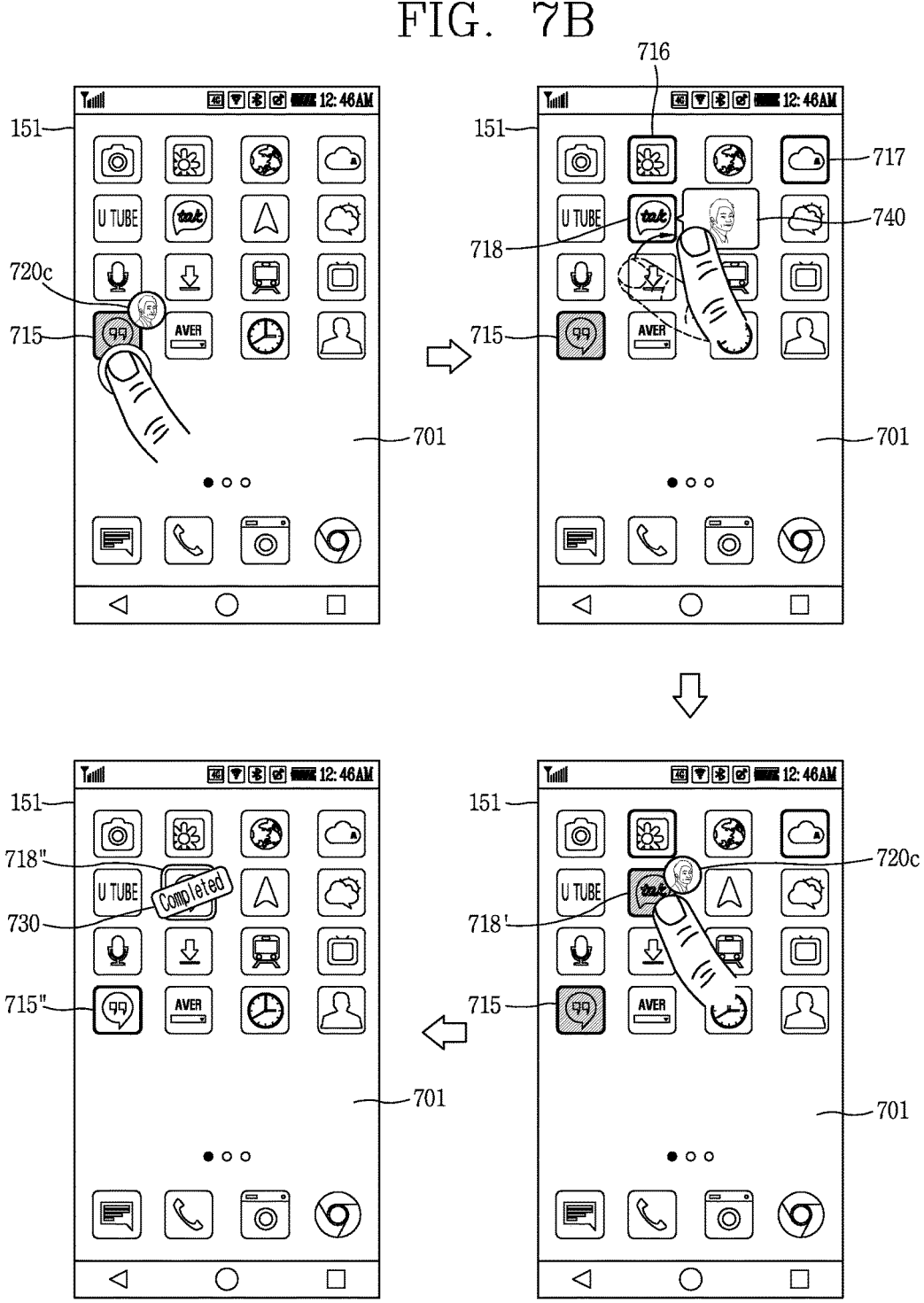

Next, FIG. 7B illustrates an embodiment of providing setting information to be applied in the form of a preview image, using a proximity touch before a second touch input is applied.

As illustrated in FIG. 7B, a profile image may be detected as setting information related to a function icon 715 to which a first touch input has first been applied, and a thumbnail image 720c of the detected profile image is popped up adjacent to the corresponding function icon 715. In this instance, in one embodiment, upon detecting user information such as the profile image, an execution of an additional user authentication procedure may be required for protecting personal information. For example, when the first touch input is applied to the function icon 715, a separate notification window for requesting for a user authentication, such as scanning a finger or inputting a password, may be popped up before the thumbnail image 720c of the profile image is output.

Also, the controller 180 may recommend an application to which the detected profile image can be applied to the user. That is, recommendation information notifying an application to which the detected setting information can be applied as a setting value may be output on the second area, namely, the home screen.

In detail, icons 716, 717 and 718 of applications, to which the profile image can be applied as a setting value, among those different icons output on the home screen 701, may be indicated in a manner of being visually distinguished from the other icons. Here, the visually-distinguished indication is associated with icons of applications which are selected based on the detected setting information. For example, at least one of an image, a shape, a size, a color, a highlighting effect and a shadow effect with respect to such icons of the applications is changed.

When a proximity touch is applied to one of the icons 716, 717 and 718 of the applications indicated in the visually distinguished manner, the setting information to be applied, namely, the profile image may be output in the form of a preview image 740. In this instance, the image 740 may be an image different from the thumbnail image 720c. For example, the image 740 may have an extended form of the thumbnail image 720c, in view of at least one of a size, a shape, resolution, an included object and an output range of the thumbnail image 720c. As another example, the image 740 may be a video for the thumbnail image 720c.

In this state, when a position of the proximity touch is changed close to an icon of another application to which the setting change can be applied, the corresponding image 740 may also be re-located to indicate the icon of the another application. Meanwhile, when the proximity touch is moved close to an icon of an application to which the setting change cannot be applied, the corresponding image 740 may disappear or be fixed to a previous position.

Next, in the state that the setting information to be applied is output in the form of the preview image 740, when the proximity touch is brought into contact with the display unit 151, the notification icon 720c notifying that the detected profile image is to be applied to the setting of the application is popped up on a corresponding icon 718' at the corresponding contact time point.

Meanwhile, in one embodiment, when the proximity touch is released without being brought into contact with the display unit 151, the controller 180 may generate a control command for stopping the application of the detected setting information. In this instance, when the second touch input is applied to an icon of a specific application, a control command for executing the corresponding application is generated.

Although not illustrated, in one embodiment, the controller 180 may limit a number of times or a time for applying the detected setting information as a setting value. For example, when the second touch input is not applied for a predetermined time after the setting information is detected or a number of times of applying the second touch input reaches a preset number of times, the operation mode for applying the detected setting information as a setting value of another application may be terminated. This is similar to a case where a seal is not stamped any more due to a stamping ink on the seal being dried after affixing the seal several times.

Figure 8:
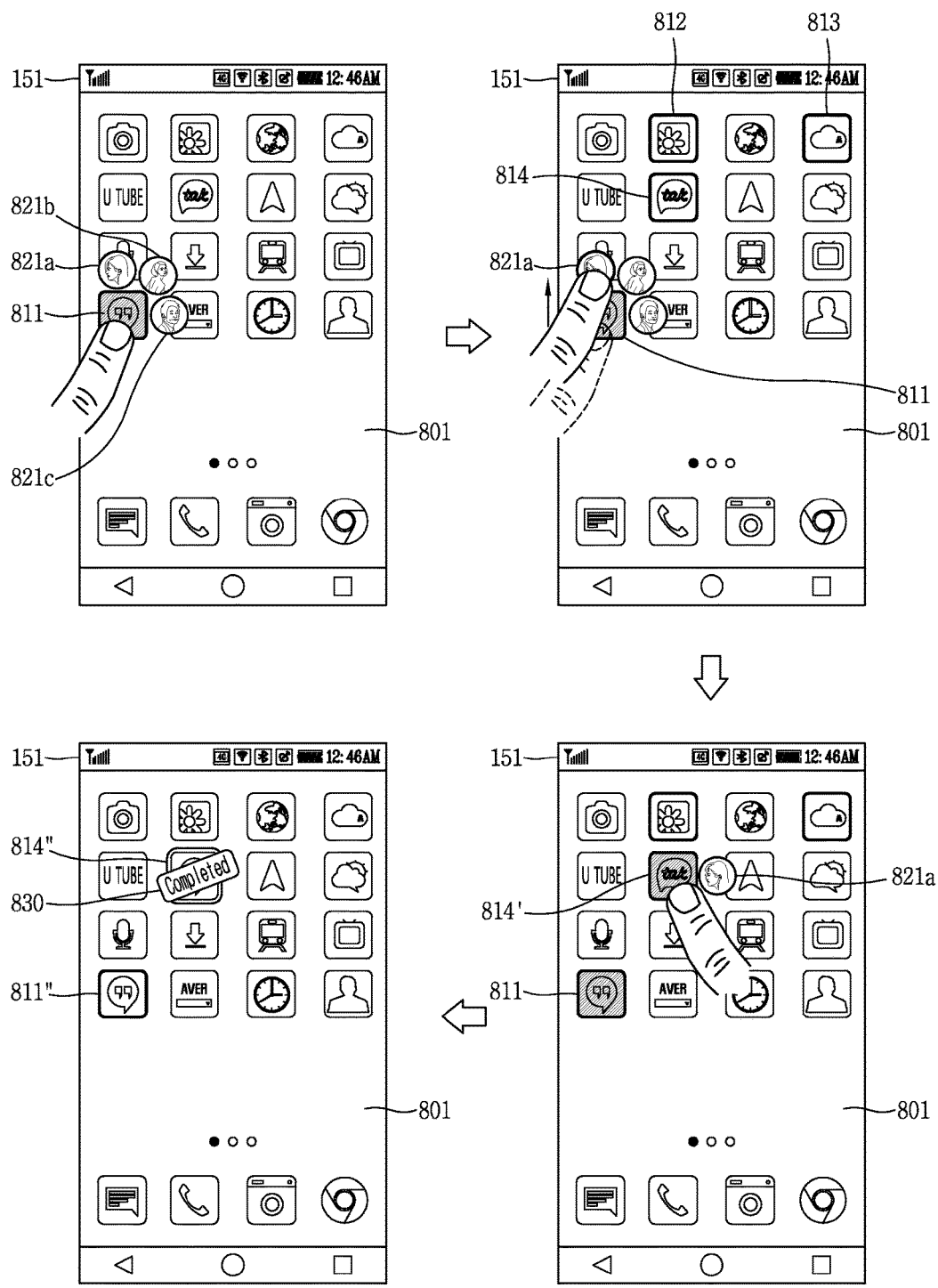

Also, as one embodiment according to the present invention, FIG. 8 illustrates an exemplary operation when a plurality of setting information with the same attribute and content are detected. That is, FIG. 7A has illustrated that setting information with different attributes are detected in plurality and thus distinguishably indicated for each attribute. However, when the plurality of setting information have the same attribute and even the same content, a different indicating method is required.

FIG. 8 illustrates an embodiment that a plurality of profile images (photos) are detected as setting information of a first application, in response to a first touch input being applied to an icon 811 of the first application.

In detail, when the first touch input is applied to the icon 811 of the first application, the controller 180 may output a plurality of setting values corresponding to the detected setting information, for example, a plurality of objects corresponding to a plurality of profile images, namely, a plurality of thumbnail images 821a, 821b and 821c adjacent to the icon 811 of the first application.

In this state, when the first touch input is dragged toward one (e.g., 821a) of the plurality of thumbnail images 821a, 821b and 821c from the icon 811 of the first application, the setting value corresponding to the object, namely, the first profile image may be applied as setting information of a second application corresponding to an icon 814 to which the second touch input is applied. While the first touch input is maintained, visually-distinguished graphic objects may be output adjacent to icons 812, 813 and 814 of applications for which the detected plurality of profile images can be set as user information.

Also, while the setting information is applied to the second application, the first profile image 821a is output adjacent to an icon 814' of the second application. Also, when the first profile image 821a is completely applied, a notification icon 830 notifying the completion is output adjacent to the icon of the second application.

Figure 9A:
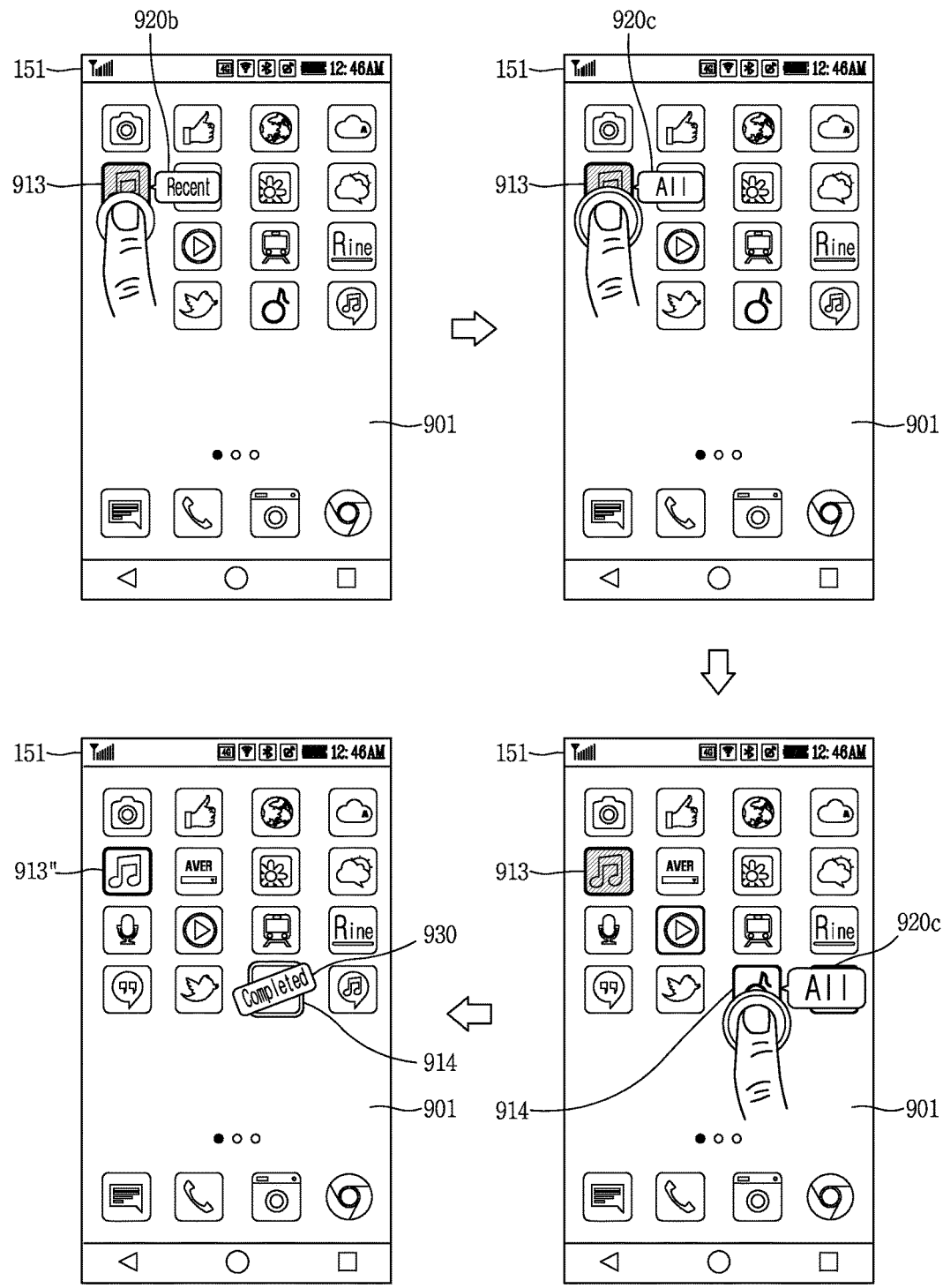
Figure 9B:
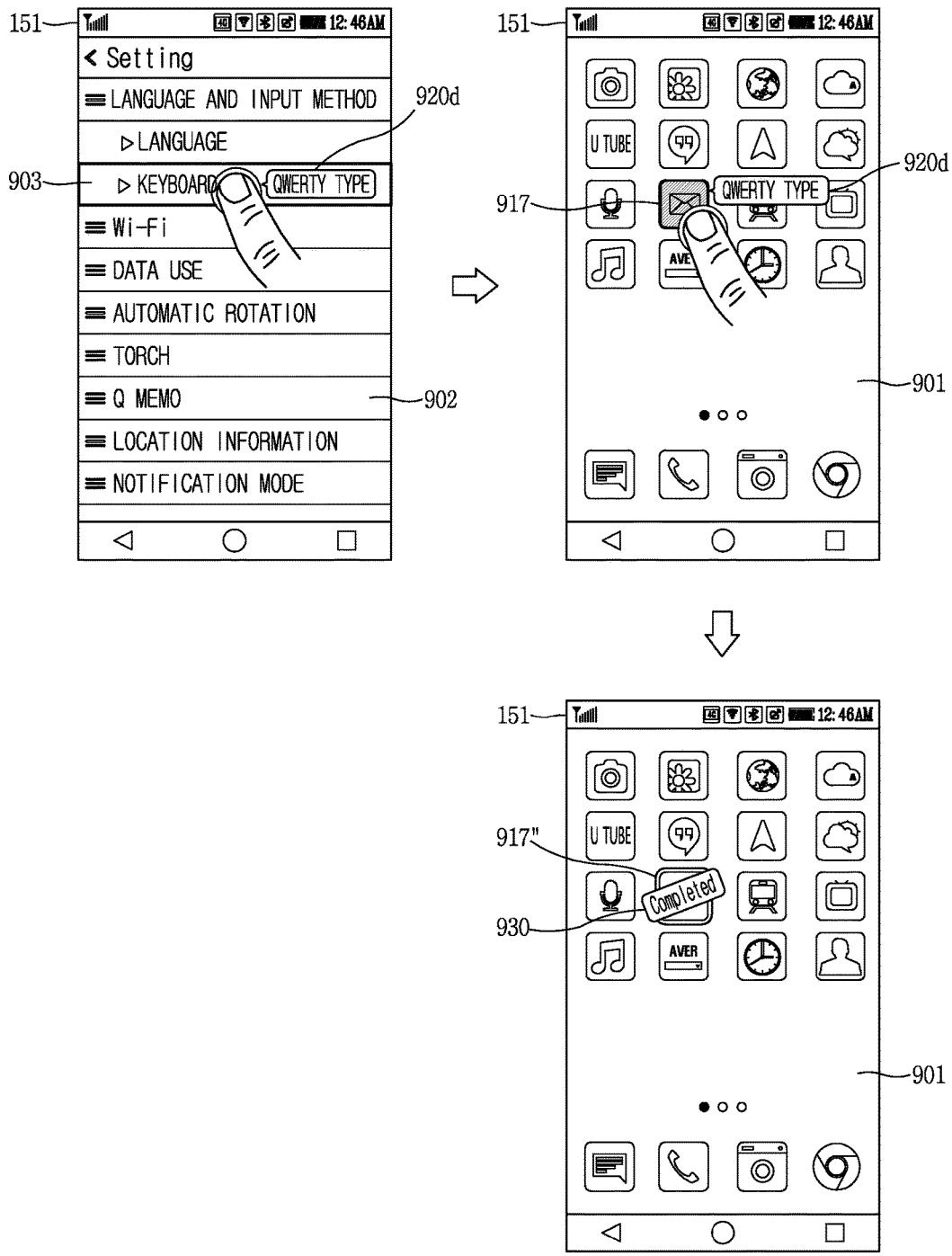
Figure 9C:
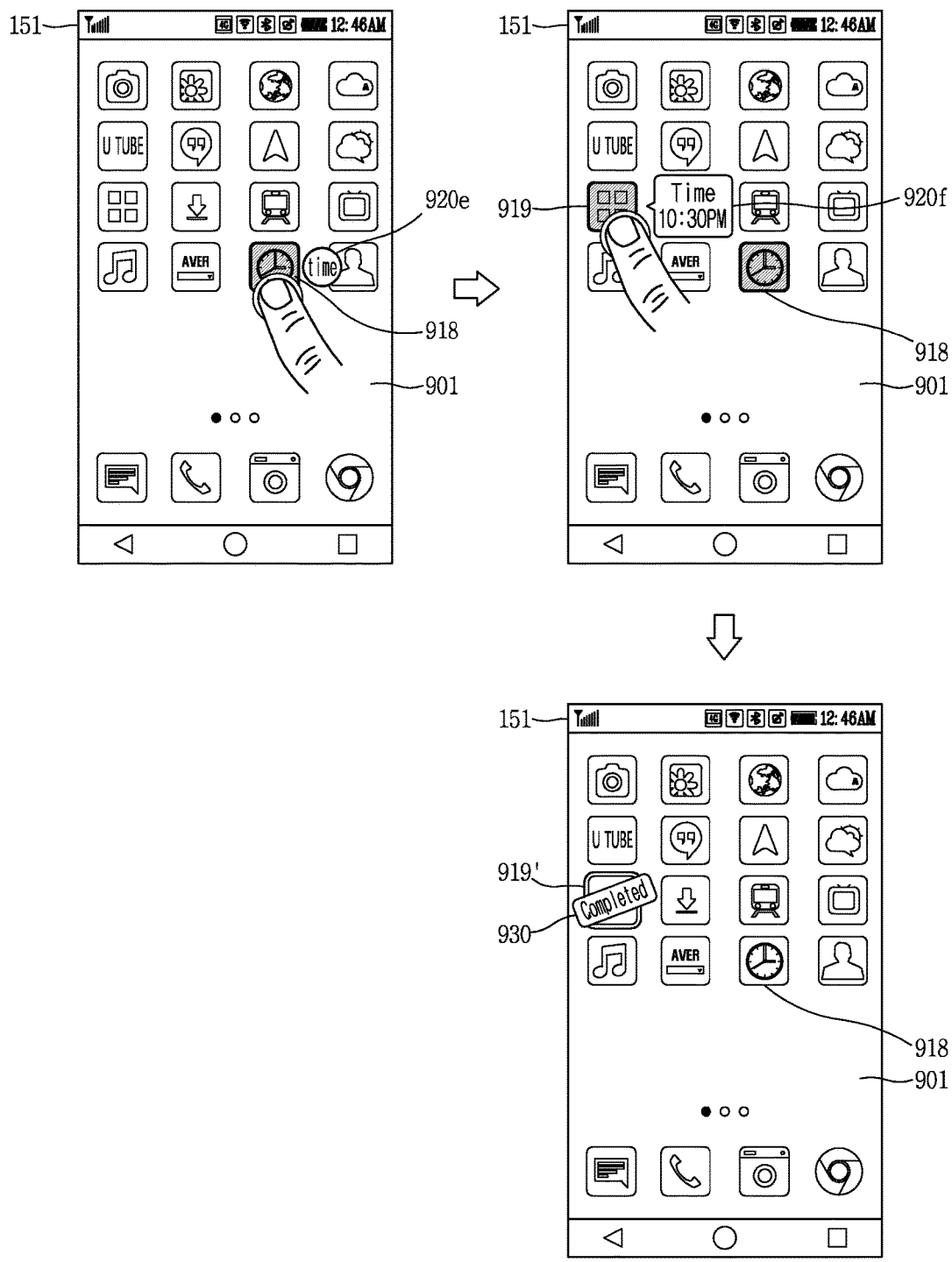

Hereinafter, FIGS. 9A to 9C illustrate more various embodiments of applying setting information detected based on a touch degree of a touch input to at least one application.

As one embodiment, in FIG. 9A, when a first touch input exceeding reference pressure is applied to an icon 913 of a first sound source application on a home screen 901, a recent playlist may be detected among setting information preset for the first sound source application. Accordingly, a first notification icon 920b notifying that the recent playlist has been detected may be output adjacent to the icon 913 of the first sound source application.

In this state, when touch pressure of the first touch input more increases and accordingly a detected voltage level also more increases, a playlist of every sound source played on the first sound source application may be detected. Accordingly, the first notification icon 920b is changed into a second notification icon 920c notifying that the playlist of every sound source has been detected. That is, the controller 180 may vary the touch degree of the first touch input exceeding the reference pressure, thereby adjusting a detection degree of the setting information. For example, unlike FIG. 9A, when the touch pressure of the first touch input is reduced, only the last-played sound source may be detected as the setting information.

Next, when a second touch input is applied to an icon 914 of a second sound source application on the home screen 901, the playlist of every sound source detected from the first sound source application is also set in the second sound source application. In this instance, associated information, such as a play order and a play degree on the first sound source application may also be provided.

In this manner, according to the present invention, in order to open the playlist, it is not required to perform such complicated operations, such as activating the first sound source application, executing a plurality of manipulations, activating the second sound source application and downloading the playlist. That is, according to the present invention, desired setting information can be fast applied merely by applying two touch inputs while maintaining a home screen.

Also, as one embodiment, FIG. 9B illustrates an embodiment of applying a different setting value to at least one application while maintaining a current setting value of a specific setting item selected from a setting application.

In detail, in FIG. 9B, when varying touch pressure of a first touch input exceeding reference pressure, which is applied to a keyboard setting item 903 on an execution screen 902 of a setting application, the controller 180 may detect a setting value different from a current setting value, for example, a qwerty-type keyboard setting (e.g., a second keyboard manner) as setting information, while maintaining a current keyboard setting (e.g., first keyboard manner).

Next, when a second touch input is applied to an icon of a specific application, for example, an icon 917 of a message application after the execution screen 902 of the setting application is changed to a home screen page 901, only an input manner of the message application may be changed into the qwerty-type keyboard setting. That is, an input is executed in the second keyboard manner in the message application and in the first keyboard manner in other applications.

Also, as one embodiment, FIG. 9C illustrates an embodiment of fast setting an alarm time set in an alarm application to be linked with an execution condition of another application.

In FIG. 9C, when a first touch input exceeding reference pressure is applied to an icon 918 of an alarm application on a home screen 901, an alarm time set in the alarm application is detected as setting information. In this instance, when the set alarm time is in plurality, the plurality of alarm times set may be displayed adjacent to the icon 918 in the form of a plurality of thumbnail images.

When a touch is applied to an icon 919 of the second application after the first touch input is released, notification information 920f notifying the detected alarm time is output adjacent to the icon 919 of the second application. Afterwards, the second application may automatically be executed at the alarm time indicated on the notification information 920f. That is, an execution condition of an application may be linked with a detected alarm time. Meanwhile, in one embodiment, when information, for example, schedule information, which matches the alarm time, is included in the second application, the detected alarm time may also automatically be set as an alarm time of the schedule information.

Also, although not illustrated, the controller 180 may additionally output a popup window (e.g., Do you want to change the setting?) for checking the setting change, prior to applying the detected setting information to at least one application, in order to prevent the setting change due to a wrong input.

Also, when a proximity touch is applied to a specific icon of the second area after the first touch input, the controller 180 may output a current setting value of a corresponding application, namely, a matched setting value of the application before applying the detected setting information, for a preset time. It may be helpful for the user to reconsider whether or not to change the current setting value.

In on embodiment, when the second touch input succeeding the first touch input is applied, if an attribute of a setting of at least one application included in the second area does not match the attribute of the detected setting information, the controller 180 may search for a setting with an attribute similar to the attribute of the detected setting information, among settings of the application, and apply the detected setting information to the searched setting value.

Next, FIGS. 10, 11, 12A and 12B illustrate embodiments of a method for fast restoring a changed setting value to a state before the change, in a state that a setting of at least one application has been changed according to one of the foregoing embodiments.

First, as illustrated in FIG. 10, when setting information pre-detected using the second touch input is set for a specific application during the first operation mode, a notification icon 1030 notifying the change of the setting information may be output adjacent to an icon of the corresponding application.

Afterwards, when a touch input exceeding reference pressure is applied to a back key 123a for executing an input cancellation, a second operation mode for canceling a pre-applied setting change may be executed. In detail, in one embodiment, in a state that detected setting information has been applied to an application included in the second area, the controller 180 may restore the setting information-applied state to a previous state, on the basis of a touch degree of a touch input applied to a menu for canceling an execution of a command input.

Here, FIG. 10 illustrates an embodiment that the back key 123a is output on a lower end of the display unit 151 in the form of a soft key. However, position and attribute (hidden or not, soft/hard key, etc.) of the back key 123a for executing the second operation mode may differ, of course.

When a touch input exceeding reference pressure is applied to the back key 123a, a notification icon 1020a notifying that the second operation mode, namely, a state in which a pre-applied setting value can be canceled has been activated may be popped up on one area of the display unit 151. After the notification icon 1020a is output, when a touch is applied to an icon 1011 of an application for which the changed setting is to be canceled on a home screen 1001, the setting change applied to the application is restored to an original setting.

Meanwhile, in one embodiment, after the notification icon 1020a is output, guide information informing applications to which the setting change has been applied, namely, applications for which the pre-applied setting change is to be canceled may be output on the display unit 151. For example, a preset graphic object or graphic effect may be output around an icon of an application for which a pre-applied setting change is to be canceled, so as to be distinguished from icons of other applications.

Although not illustrated, the controller 180 may differently decide target applications to cancel a setting change pre-applied thereto and a range of the cancelation, according to a touch point of a succeeding touch input after the touch input exceeding the reference pressure is applied to the back key 123a. For example, similar to the foregoing embodiments, when a succeeding touch input is applied to a background area of a home screen 1001 after entering the second operation mode, the settings for every application to which the setting change has been applied may be restored at once on the home screen 1001.

A notification icon (e.g., 'Completed') 1030 notifying that the cancelation of the setting change has been completed, for example, may be popped up on the icon 1011 of the application for which the pre-applied setting change has been restored to the original state, and then disappear.

Also, in one embodiment, the controller 180 may differently apply a degree that a setting of an application of the second area is restored to a previous state, according to a varied degree of a touch input exceeding reference pressure, applied to a menu of canceling an execution of a command input.

Figure 11:
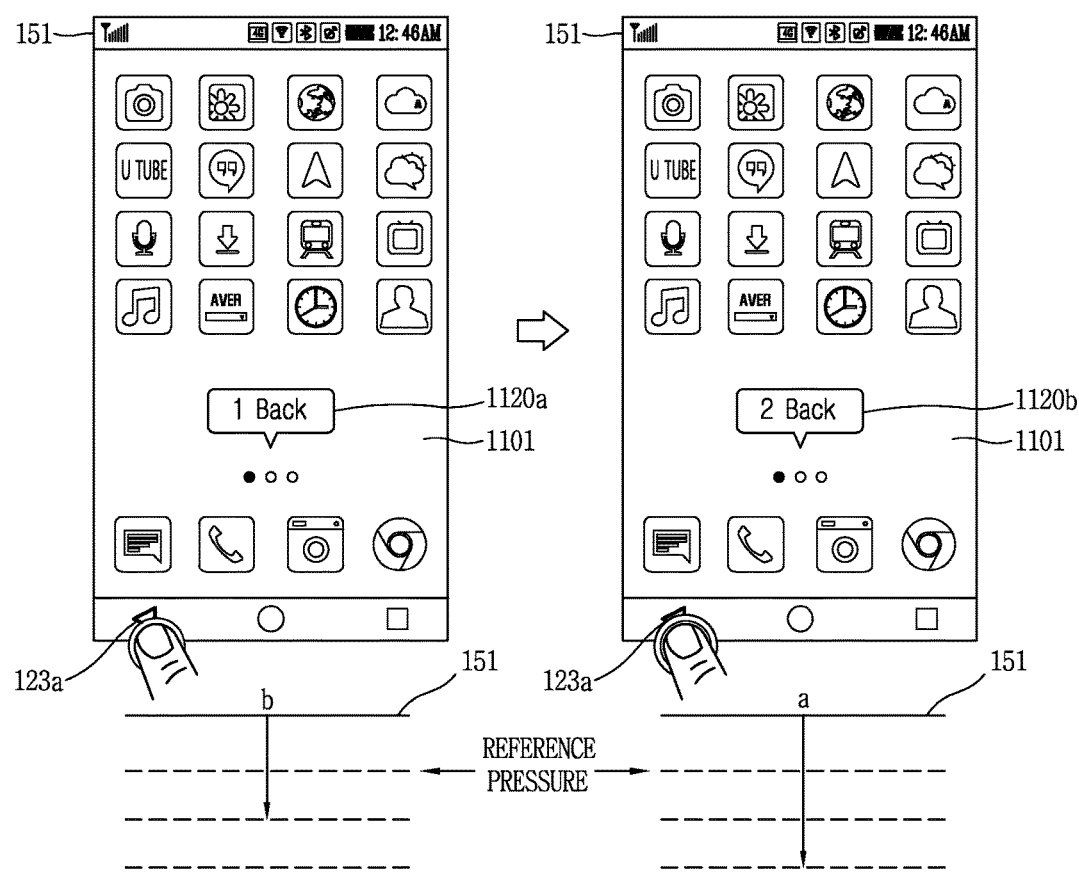

For example, as illustrated in FIG. 11, in a state that setting information detected has been applied to at least one application, when a touch input exceeding reference pressure is applied by intensity b to a back key output on a lower end of a home screen 1101, a state that a pre-applied setting change is to be canceled in a range of a first level is activated (1120*a*). When a touch input with intensity a greater than the intensity b is applied to the back key, a state that the pre-applied setting change is to be canceled in a range of a second level more increased than the first level range is activated to correspond to the increased intensity of the touch pressure. This state is variable while the touch input applied to the back key is maintained.

Also, the touch pressure of the touch input applied to the back key may be divided into two levels or more, and accordingly, the canceled degree of the setting change may also be divided into more detailed levels than the first and second levels.

Figure 12A:
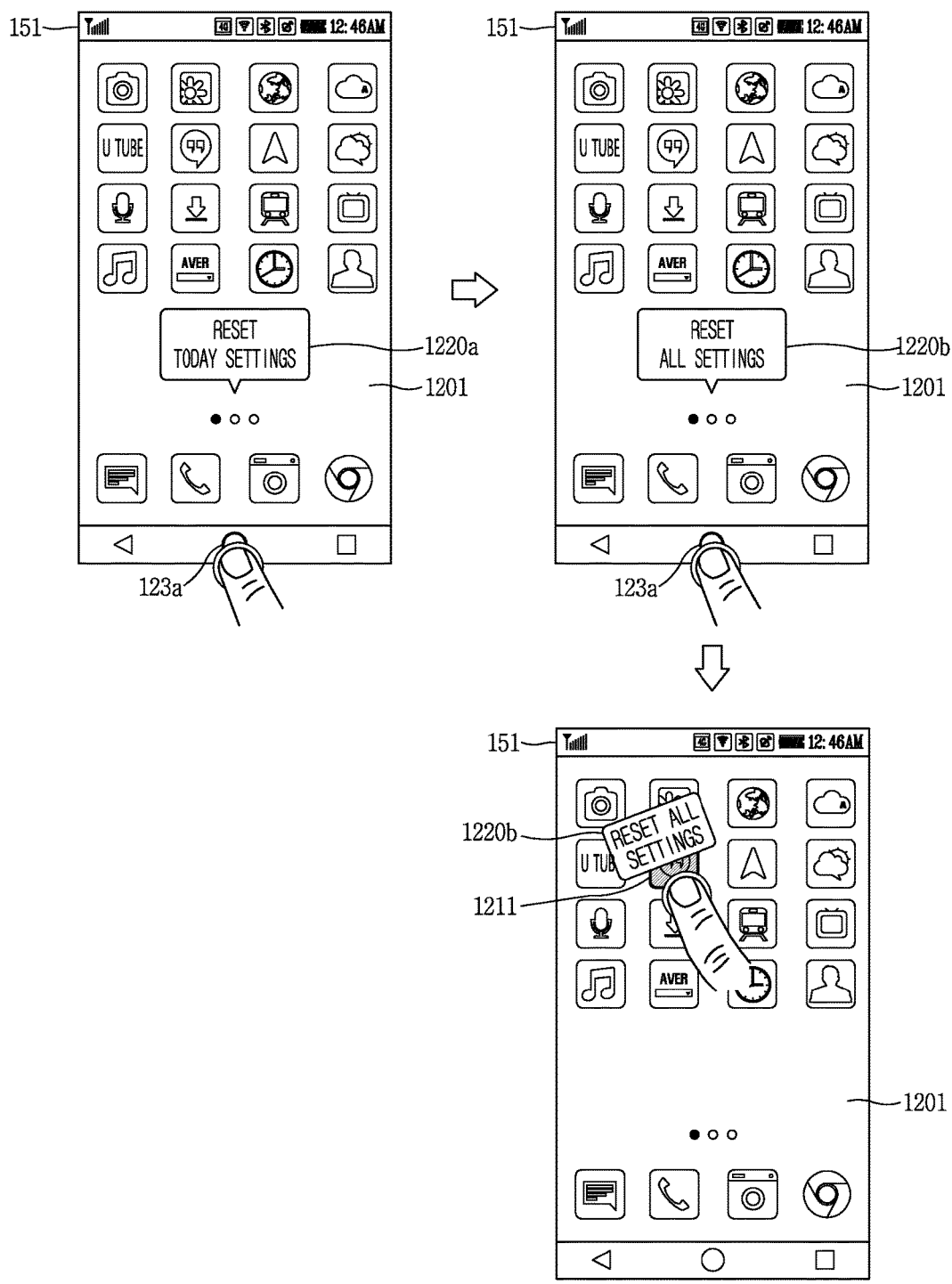
Figure 12B:
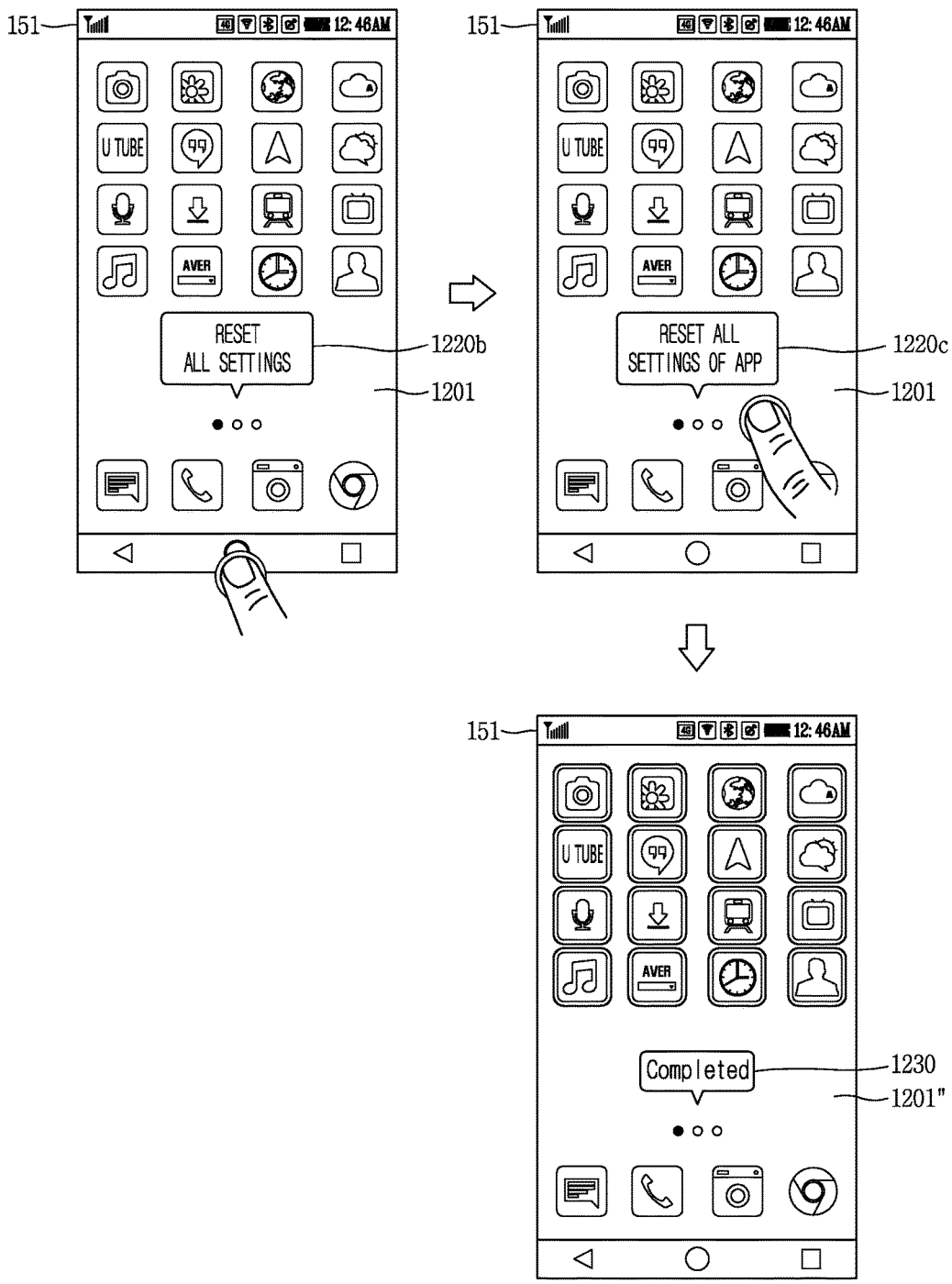

As one embodiment according to the present invention, FIGS. 12A and 12B illustrate embodiments of a method of fast restoring a plurality of changed settings changes executed in a first operation mode, using a home key output on the display unit 151.

To this end, FIGS. 12A and 12B illustrate the use of a home key 123*a* output in the form of a soft key on the lower end of the display unit 151. However, position and attribute (hidden or not, soft/hard key, etc.) of the hole key may differ, of course.

After a setting change for at least one application is executed and/or a plurality of setting changes are executed, when a touch input exceeding reference pressure is applied to the home key 123*a*, a second operation mode of simultaneously initializing the plurality of setting changes corresponding to a specific criterion may be entered. Accordingly, as illustrated in FIG. 12A, a notification icon 1220*a* notifying a state that setting changes executed today can be initialized may be output on a background area of a home screen 1201.

In this instance, when touch pressure of the touch input applied to the home key 123*a* increases more, the controller 180 may more extend a cancelation degree of the plurality of setting changes, and switches the state notified by the notification icon 1220*a* into a state for initializing every setting change.

Afterwards, when a touch is applied to an icon 1211 of an application, for which the setting change has been applied according to the first operation mode, at least two times on the home screen 1201, every setting change applied to the application is initialized (1220*b*). Here, the initialization of every setting change may include every setting change applied through other user manipulations, as well as a setting change executed according to the first operation mode. That is, the initialization of the setting change may refer to an initialized state at the moment of an installation of an application.

Meanwhile, when a succeeding touch is applied to one point of a background area of the home screen 1201 in a third operation mode, as illustrated in FIG. 12B, the setting changes for every application corresponding to icons output on the home screen are initialized (1220*c*). Accordingly, a visual effect (indication) 1201" indicating that the setting changes have been initialized may be output around every application icon output on the home screen 1201 and then disappear.

Figure 13:
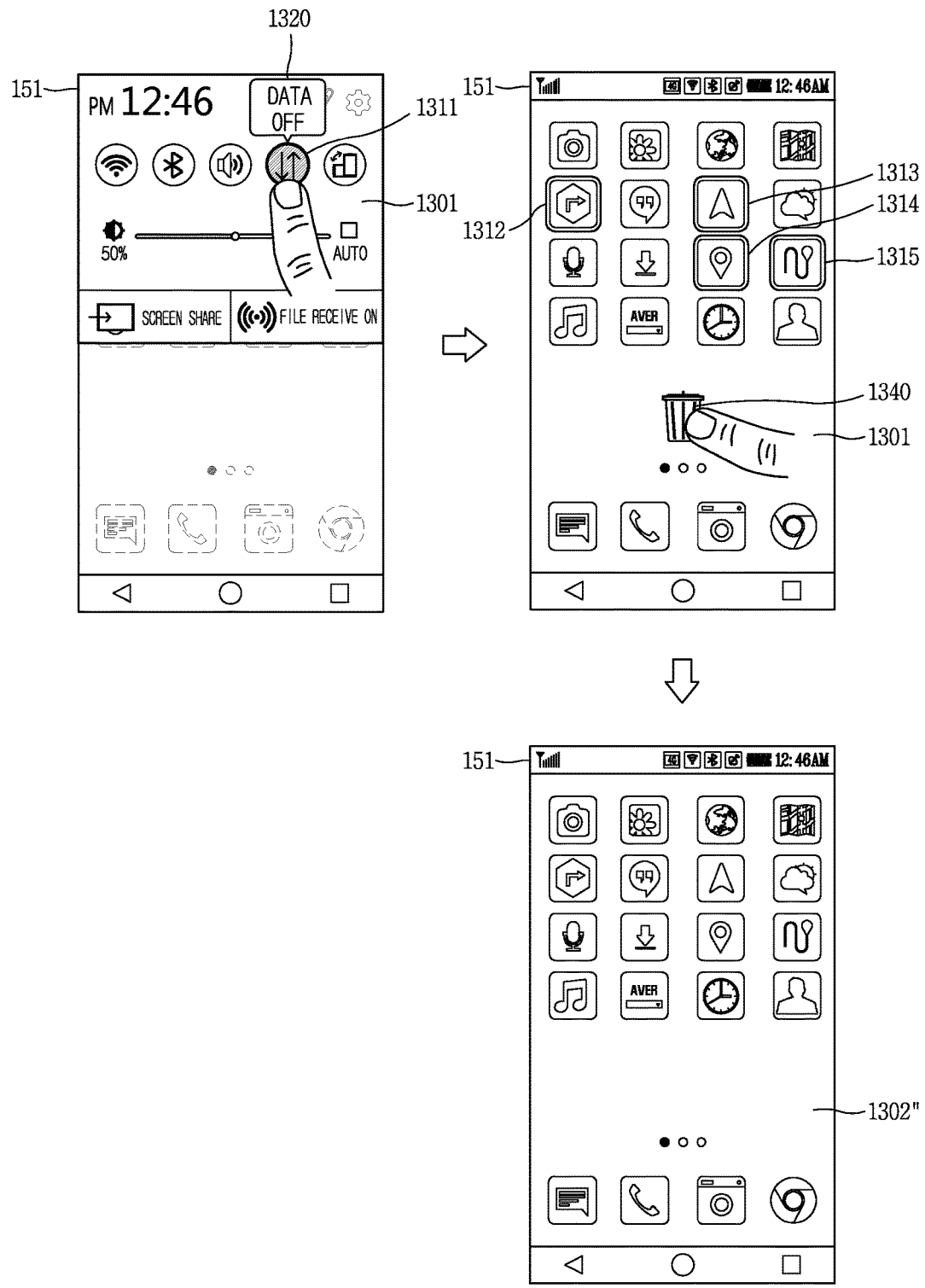

In one embodiment, FIG. 13 illustrates an embodiment of terminating the first operation mode before applying setting information to another application, after detecting the setting information according to a first touch input applied to a function icon.

To this end, when setting information for a function icon is detected, a release icon for releasing the detected state of the setting information may be output at a specific position on the second area while the first operation mode is executed. For example, as illustrated in FIG. 13, when a setting value of 'data OFF' is detected on a quick setting window screen 1301, guide information may be output around icons 1312, 1313, 1314 and 1315 of a plurality of applications to which the detected setting information can be applied on the home screen 1301 corresponding to the second area. And, a wastebasket icon 1340 for releasing the detected state of the setting information may be generated on one area of the home screen 1301 corresponding to the second area.

Next, when the second touch input is applied to a wastebasket icon 1340, other than one of the icons 1312, 1313, 1314 and 1315 of the plurality of applications, the process for applying the detected setting information to at least one application is terminated. Accordingly, the guide information output around the icons 1312, 1313, 1314 and 1315 of the plurality of applications disappears.

According to the aforementioned embodiments, a detected state of setting information for a function icon can be released at any time, and a setting change can fast be canceled or initialized using a back key or home key even after the detected setting information is applied to at least one application at least one time.

As described above, in a mobile terminal and a method for controlling the same according to embodiments of the present invention, a fast setting change for a specific application or some applications can be allowed using touch inputs. Specifically, even without an execution of an application with a setting desired to change, a setting value desired to be applied may be detected and intuitively applied to a desired application. In addition, a pre-applied setting change can fast be restored to an original state using a back key or a home key.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touchscreen configured to display information; and
a controller configured to:
cause the touchscreen to display a function icon;
select a setting from a plurality of setting options related to the function icon in response to a first touch input to the displayed function icon, wherein the setting is selected from the plurality of setting options based on a characteristic of the first touch input;
execute an operation mode for applying the selected setting to one or more applications; and
while in the operation mode:
receive a second touch input;
in response to determining that a location of the second touch input corresponds to a region of a home screen comprising a displayed at least one icon:
apply the selected setting to a setting of a first application of one or more applications corresponding to the at least one icon displayed on the home screen of the touchscreen, wherein the selected setting is applied to the first application without executing the first application;
cause the touchscreen to display a notification indicating that the selected setting has been applied to the first application of the one or more applications in response to detecting that the second touch input has been released; and
after detecting that the second touch input has been released, apply the selected setting to a second application of the one or more applications corresponding to another icon displayed on the home screen of the touchscreen without an additional input to the displayed function icon in response to determining that a location of a third touch input corresponds to the another icon;
in response to determining that the location of the second touch input corresponds to a background region of the home screen:
apply the selected setting to all applications corresponding to all of the at least one icon displayed on the home screen;
wherein only a location of the second touch input determines which application will be modified by the selected setting.

2. The terminal of claim 1, wherein:
the characteristic of the first touch input corresponds to a level of pressure applied by the first touch input to the touchscreen, and
the plurality of setting options each correspond to a different level of pressure applied to the touchscreen.

3. The terminal of claim 1, wherein the controller is further configured to cause the touchscreen to display an indicator indicating icons of the at least one icon which correspond to applications which can apply the selected setting.

4. The terminal of claim 1, wherein the controller is further configured to cause the touchscreen to display an indicator of the selected setting information adjacent to the function icon when the setting information is selected.

5. The terminal of claim 4, wherein
the selected setting is selected from the plurality of setting options based on a level of pressure applied by the first touch input to the touchscreen; and
the controller is further configured to cause the touchscreen to change the displayed indicator when the selected setting is changed based on a change to the level of pressure applied by the first touch input.

6. The terminal of claim 1, wherein the controller is further configured to:
cause the touchscreen to display a plurality of objects corresponding to the plurality of setting options at a position adjacent to the function icon; and
apply the selected setting to the setting of the one or more applications when an object of the plurality objects corresponding to the selected setting is dragged to an icon of the displayed at least one icon corresponding to the one or more applications.

7. The terminal of claim 1, wherein additional touch inputs following the first touch input but before the second touch input are received to the touchscreen for navigating to a screen including the at least one icon.

8. The terminal of claim 1, wherein the controller is further configured to revert a setting of the one or more applications to a previous setting in response to a third touch input to a displayed menu, wherein a level of pressure of the third touch input to the displayed menu corresponds to cancelling a setting command.

9. The terminal of claim 8, wherein a degree of reverting the setting of the one or more applications to the previous setting differs based on a level of pressure applied by the third touch input to the touchscreen.

10. The terminal of claim 1, wherein the controller is further configured to:
cause the touchscreen to display a release icon; and
release a setting command mode in response to a touch input to the displayed release icon after the first touch input but before the second touch input such that the selected setting is not applied to any of the one or more applications.

11. A method for applying an application setting, the method comprising:
displaying a function icon via a touchscreen;
receiving a first touch input to the function icon and detecting a characteristic of the first touch input;
selecting a setting from a plurality of setting options related to the function icon in response to the first touch input, wherein the setting is selected from the plurality of setting options based on the characteristic of the first touch input;
executing an operation mode for applying the selected setting to one or more applications; and
while in the operation mode:
receiving a second touch input;
in response to determining that a location of the second touch input corresponds to a region of a home screen comprising a displayed at least one icon:
applying the selected setting to a setting of a first application of one or more applications corresponding to the at least one icon displayed on the home screen of the touchscreen, wherein the selected setting is applied to the first application without executing the first application;
displaying a notification indicating that the selected setting has been applied to the first application of the one or more applications in response to detecting that the second touch input has been released; and after detecting that the second touch input has been released, applying the selected setting to a second application of the one or more applications corresponding to another icon displayed on the home screen of the touchscreen without an additional input to the displayed function icon in response to determining that a location of a third touch input corresponds to the another icon;

in response to determining that the location of the second touch input corresponds to a background region of the home screen:

applying the selected setting to all applications corresponding to all of the at least one icon displayed on the home screen;

wherein only a location of the second touch input determines which application will be modified by the selected setting.

12. The method of claim 11, wherein:
the characteristic of the first touch input corresponds to a level of pressure applied by the first touch input to the touchscreen, and
the plurality of setting options each correspond to a different level of pressure applied to the touchscreen.

13. The method of claim 11, further comprising displaying an indicator indicating icons of the at least one icon which correspond to applications which can apply the selected setting.

14. The method of claim 11, further comprising displaying an indicator of the selected setting information adjacent to the function icon when the setting information is selected.

15. The method of claim 11, wherein:
the selected setting is selected from the plurality of setting options based on a level of pressure applied by the first touch input to the touchscreen; and
the method further comprises changing the displayed indicator when the selected setting is changed based on a change to the level of pressure applied by the first touch input.

16. The method of claim 11, further comprising:
displaying a plurality of objects corresponding to the plurality of setting options at a position adjacent to the function icon; and
applying the selected setting to the setting of the one or more applications when an object of the plurality objects corresponding to the selected setting is dragged to an icon of the displayed at least one icon corresponding to the one or more applications.

17. The method of claim 11, further comprising reverting a setting of the one or more applications to a previous setting in response to a third touch input to a displayed menu, wherein a level of pressure of the third touch input to the displayed menu corresponds to cancelling a setting command.

18. The method of claim 17, wherein a degree of reverting the setting of the one or more applications to the previous setting differs based on a level of pressure applied by the third touch input to the touchscreen.

* * * * *